（12） United States Patent
Takahashi

(10) Patent No.: US 11,267,473 B2
(45) Date of Patent: Mar. 8, 2022

(54) VEHICLE LANE CHANGE ASSIST APPARATUS

(71) Applicant: TOYOTA JIDOSHA KABUSHIKI KAISHA, Toyota (JP)

(72) Inventor: Kentaro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 16/400,162

(22) Filed: May 1, 2019

(65) Prior Publication Data

US 2020/0079375 A1 Mar. 12, 2020

(30) Foreign Application Priority Data

Sep. 7, 2018 (JP) .............................. JP2018-167809

(51) Int. Cl.
*B60W 30/18* (2012.01)
*G08G 1/16* (2006.01)
(Continued)

(52) U.S. Cl.
CPC ...... *B60W 30/18163* (2013.01); *B60W 30/09* (2013.01); *B60W 30/0956* (2013.01); *B60W 30/165* (2013.01); *G08G 1/167* (2013.01)

(58) Field of Classification Search
CPC .......... B60W 30/18163; B60W 30/09; B60W 30/0956; B60W 30/165; B60W 30/08; B60W 60/0027; G08G 1/167; G08G 1/166
See application file for complete search history.

(56) References Cited

U.S. PATENT DOCUMENTS 10,351,137 B2* 7/2019 Shin ................ B60W 30/18163
2004/0107030 A1* 6/2004 Nishira ................. B60W 50/14
701/36
(Continued)

FOREIGN PATENT DOCUMENTS

JP 2005-138647 A 6/2005
JP 2006-315491 A 11/2006
(Continued)

*Primary Examiner* — Jeff A Burke
*Assistant Examiner* — Joshua Alexander Garza
(74) *Attorney, Agent, or Firm* — Sughrue Mion, PLLC

(57) ABSTRACT

A vehicle lane change assist apparatus of the invention determines that objects approaching a vehicle and having a predicted reaching time equal to or shorter than a predetermined predicted reaching time, satisfy a first condition and selects the objects satisfying the first condition as condition-determining-target-candidate objects with the number of the condition-determining-target-candidate objects being limited to a first number. The apparatus selects the condition-determining-target-candidate objects satisfying a second condition, as condition-determining-target objects with the number of the condition-determining-target objects being limited a second number equal to or smaller than the first number when a lane change assist control is requested. The apparatus executes the lane change assist control when a lane change execution condition that the vehicle does not contact any of the condition-determining-target objects while the vehicle is caused to move to a next lane by the lane change assist control, is satisfied.

3 Claims, 15 Drawing Sheets

(51) Int. Cl.
    *B60W 30/095*     (2012.01)
    *B60W 30/09*     (2012.01)
    *B60W 30/165*     (2020.01)

(56) References Cited

U.S. PATENT DOCUMENTS

| | | |
|---|---|---|
| 2005/0270145 A1 | 12/2005 | Kataoka et al. |
| 2006/0025918 A1 | 2/2006 | Saeki |
| 2007/0078601 A1* | 4/2007 | Nakano ................ B60W 30/16 701/301 |
| 2007/0282532 A1 | 12/2007 | Yamamoto et al. |
| 2016/0311464 A1 | 10/2016 | Yamaoka |
| 2018/0057002 A1* | 3/2018 | Lee ........................ B60W 30/16 |
| 2018/0061253 A1* | 3/2018 | Hyun ..................... G08G 1/015 |
| 2018/0257660 A1* | 9/2018 | Ibrahim ................. H04L 67/12 |
| 2019/0333381 A1* | 10/2019 | Shalev-Shwartz .... B60W 50/10 |

FOREIGN PATENT DOCUMENTS

| | | |
|---|---|---|
| JP | 2008-65480 A | 3/2008 |
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2009-274594 A | 11/2009 |
| JP | 2010-006279 A | 1/2010 |
| JP | 4929777 B2 | 5/2012 |
| JP | 2014-148293 A | 8/2014 |
| JP | 2016-207060 A | 12/2016 |
| JP | 2017-074823 A | 4/2017 |

\* cited by examiner

VEHICLE LANE CHANGE ASSIST APPARATUS

BACKGROUND

Field

The invention relates to a vehicle lane change assist apparatus for moving an own vehicle to a target next lane.

Description of the Related Art

There is known a vehicle lane change assist apparatus for executing a lane change assist control for moving an own vehicle to a target next lane (see JP 2009-274594 A). The target next lane is a lane next to a lane, on which the own vehicle moves, which a driver of the own vehicle desires to move the own vehicle. The known vehicle lane change assist apparatus determines whether a situation around the own vehicle is a situation that an execution of the lane change assist control is permitted when the execution of the lane change assist control is requested by the driver of the own vehicle. In particular, the known vehicle lane change assist apparatus determines whether the situation around the own vehicle is a situation that the own vehicle is caused to move to the target next lane without contacting another vehicle.

There is a need to acquire information on the other vehicle in order to determine whether the situation around the own vehicle is a situation that the own vehicle is caused to move to the target next lane without contacting the other vehicle. Radar sensors each for detecting the other vehicles around the own vehicle, are installed in the own vehicle provided with the known vehicle lane change assist apparatus. Each of the radar sensors detects the other vehicles and outputs the information on the detected other vehicles. The known vehicle lane change assist apparatus executes a process of determining whether the situation around the own vehicle is the situation that the own vehicle is caused to move to the target next lane without contacting the other vehicles. Hereinafter, the process of determining whether the situation around the own vehicle is the situation that the own vehicle is caused to move to the target next lane without contacting the other vehicles, will be referred to as "the lane change execution condition determination process".

In general, a computing power of the vehicle lane change assist apparatus is limited. Therefore, if a computing load for executing the lane change execution condition determination process, exceeds a maximum computing power of the vehicle lane change assist apparatus, the vehicle lane change assist apparatus cannot complete the lane change execution condition determination process. In this case, the vehicle lane change assist apparatus cannot move the own vehicle to the target next lane. Alternatively, it takes a long time for the vehicle lane change assist apparatus to complete an execution of the lane change execution condition determination process even if the vehicle lane change assist apparatus completes the execution of the lane change execution condition determination process. As a result, a start of moving the own vehicle to the target next lane may be delayed. Thus, it is desired that the number of the other vehicles subject to the lane change execution condition determination process is limited. Hereinafter, the other vehicle subject to the lane change execution condition determination process, will be referred to as "the condition-determining-target vehicle".

When the number of the condition-determining-target vehicles is limited, for example, to a predetermined number, and the number of the other vehicles detected by the radar sensors is equal to or smaller than the predetermined number, the vehicle lane change assist apparatus selects all the detected other vehicles as the condition-determining-target vehicles. On the other hand, when the number of the detected other vehicles is larger than the predetermined number, there is a need to select the other vehicles to be the condition-determining-target vehicles from among the detected other vehicles.

A possibility that the own vehicle contacts the other vehicle near the own vehicle while the lane change assist control is executed, is higher than a possibility that the own vehicle contacts the other vehicle apart from the own vehicle while the lane change assist control is executed. Accordingly, a method for calculating a distance between the own vehicle and each of the detected other vehicles and selecting the predetermined number of the other vehicles as the condition-determining-target vehicles in order of increasing distance, can be employed as a method for selecting the other vehicles to be the condition-determining-target vehicles from among the detected other vehicles.

However, when there are the other vehicle existing apart from the own vehicle and approaching the own vehicle at a large speed, the possibility that the own vehicle contacts the other vehicle in question while the lane change assist control is executed, is relatively high. Therefore, when the other vehicle existing apart from the own vehicle, approaches the own vehicle at the large speed, the other vehicle in question should be selected as the condition-determining-target vehicle in order to execute the lane change execution condition determination process appropriately.

SUMMARY

The invention has been made by solving the above-mentioned problems. An object of the invention is to provide a vehicle lane change assist apparatus which executes the lane change execution condition determination process appropriately and moves the own vehicle to the next lane.

A vehicle lane change assist apparatus according to the invention comprises one or more sensors (16a) and an electronic control unit (90). The one or more sensors (16a) each detects one or more cubic objects existing around an own vehicle (100) and outputting information on the detected one or more cubic objects. The electronic control unit (90) processes the information on the one or more cubic objects output from the one or more sensors (16a) to recognize the one or more cubic objects as one or more recognized cubic objects.

The electronic control unit (90) is configured to execute a candidate selection process for determining that the one or more recognized cubic objects approaching the own vehicle (100) and having a predicted reaching time (TTC) equal to or shorter than a predetermined predicted reaching time (TTCth_1), satisfy a first condition, the predicted reaching time being a time predictively taken for the one or more recognized cubic objects to reach the own vehicle (100), and selecting the one or more recognized cubic objects determined as satisfying the first condition in executing the candidate selection process, as one or more condition-determining-target-candidate cubic objects with the number of the one or more condition-determining-target-candidate cubic objects being limited to a first predetermined number (see a process of a step 1450 in FIG. 14).

Further, the electronic control unit (90) is configured to execute a target selection process for selecting the one or more condition-determining-target-candidate cubic objects satisfying a second condition, as one or more conditiondetermining-target cubic objects with the number of the one or more condition-determining-target cubic objects being limited a second predetermined number equal to or smaller than the first predetermined number (see a process of a step 1220 in FIG. 12) when an execution of a lane change assist control is requested by a driver of the own vehicle (100) (see a determination "Yes" at a step 1210 in FIG. 12), the lane change assist control being a control for moving the own vehicle (100) to a next lane which is a lane next to a lane, on which the own vehicle (100) moves.

Further, the electronic control unit (90) is configured to execute the lane change assist control (see a process of a step 1240 in FIG. 12) when a lane change execution condition is satisfied (see a determination "Yes" at a step 1230 in FIG. 12), the lane change execution condition being a condition that the own vehicle (100) does not contact any of the one or more condition-determining-target cubic objects while the own vehicle (100) is caused to move to the next lane by the lane change assist control.

A possibility that the own vehicle contacts the cubic object near the own vehicle while the own vehicle is caused to move to the next lane, is higher than a possibility that the own vehicle contacts the cubic object apart from the own vehicle while the own vehicle is caused to move to the next lane. Thus, the recognized cubic object near the own vehicle may be used as a target subject to the process of determining whether the lane change execution condition is satisfied. However, when the cubic object apart from the own vehicle, approaches the own vehicle at a high speed, the own vehicle has a relatively high possibility that the own vehicle contacts the cubic object in question even apart from the own vehicle while the own vehicle is caused to move to the next lane. Therefore, it is desired that the cubic object approaching the own vehicle at the high speed is subject to the process of determining whether the lane change execution condition is satisfied, even when the cubic object in question is apart from the own vehicle in order to move the own vehicle to the next lane safely. According to the invention, the recognized cubic object approaching the own vehicle and having the predicted reaching time equal to or shorter than the predetermined predicted reaching time, is determined as the recognized cubic object satisfying the first condition. The recognized cubic object approaching the own vehicle and having the predicted reaching time equal to or shorter than the predetermined predicted reaching time, is likely to be selected as the condition-determining-target cubic object. Thus, the process of determining whether the lane change execution condition is satisfied, can be executed appropriately. As a result, the own vehicle can be caused to move to the next lane safely.

According to an aspect of the invention, the candidate selection process may include a first candidate sub-selection process and a second candidate sub-selection process.

In this case, the electronic control unit (90) may be configured to execute the first candidate sub-selection process for determining that the one or more recognized cubic objects existing in a predetermined area (A3) around the own vehicle (100), approaching the own vehicle (100), and having the predicted reaching time (TTC) equal to or shorter than the predetermined predicted reaching time (TTCth_1), satisfy the first condition, and selecting the one or more recognized cubic objects determined as satisfying the first condition in executing the first candidate sub-selection process, as the one or more condition-determining-target-candidate cubic objects with the number of the one or more condition-determining-target-candidate cubic objects selected in executing the first candidate sub-selection process being limited to the first predetermined number (see the process of the step 1450 in FIG. 14).

Further, in this case, the electronic control unit (90) may be configured to execute the second candidate sub-selection process for determining that the one or more recognized cubic objects not selected as the one or more condition-determining-target-candidate cubic objects in executing the first candidate sub-selection process and existing in the predetermined area (A3), satisfy the first condition when the number of the one or more condition-determining-target-candidate cubic objects selected in executing the first candidate sub-selection process is smaller than the first predetermined number (see a determination "Yes" at a step 1460 in FIG. 14) and selecting the one or more recognized cubic objects determined as satisfying the first condition in executing the second candidate sub-selection process, as the one or more condition-determining-target-candidate cubic objects with the number of the one or more condition-determining-target-candidate cubic objects selected in executing the first candidate sub-selection process and the second candidate sub-selection process being limited to the first predetermined number (see a process of a step 1470 in FIG. 14).

When the number of the condition-determining-target-candidate cubic objects is limited to the first predetermined number, it is desired that the first predetermined number of the condition-determining-target-candidate cubic objects, are selected. According to this aspect of the invention, the recognized cubic objects not selected as the condition-determining-target-candidate cubic objects in executing the first candidate sub-selection process and existing in the predetermined area, are selected as the condition-determining-target-candidate cubic objects when the number of the condition-determining-target-candidate cubic objects selected in executing the first candidate sub-selection process, is smaller than the first predetermined number. As a result, the number of the condition-determining-target-candidate cubic objects, increases. Thus, the process of determining whether the lane change execution condition is satisfied, can be executed accurately.

According to another aspect of the invention, the candidate selection process may include a first candidate sub-selection process and a second candidate sub-selection process.

In this case, the electronic control unit (90) may be configured to execute the first candidate sub-selection process for determining that the one or more recognized cubic objects existing in a first predetermined area (A1, A2) around the own vehicle (100), satisfy the first condition and selecting the one or more recognized cubic objects determined as satisfying the first condition, as the one or more condition-determining-target-candidate cubic objects with the number of the one or more condition-determining-target-candidate cubic objects selected in executing the first candidate sub-selection process being limited to the first predetermined number (see processes of steps 1410 and 1430 in FIG. 14).

Further, in this case, the electronic control unit (90) may be configured to execute the second candidate sub-selection process for determining that the one or more recognized cubic objects not selected as the one or more condition-determining-target-candidate cubic objects in executing the first candidate sub-selection process, existing in a second predetermined area (A3) outside of the first predetermined area (A1, A2), approaching the own vehicle (100), and having the predicted reaching time (TTC) equal to or shorter than the predetermined predicted reaching time (TTCth_1), satisfy the first condition when the number of the one or more condition-determining-target-candidate cubic objects selected in executing the first candidate sub-selection process is smaller than the first predetermined number (see determinations "Yes" at steps 1420 and 1440 in FIG. 14) and selecting the one or more recognized cubic objects determined as satisfying the first condition in executing the second candidate sub-selection process, as the one or more condition-determining-target-candidate cubic objects with the number of the one or more condition-determining-target-candidate cubic objects selected in executing the first candidate sub-selection process and the second candidate sub-selection process being limited to the first predetermined number (see the process of the step 1450 in FIG. 14).

It is desired that the condition-determining-target-candidate cubic objects are selected from among the recognized cubic objects closer to the own vehicle in order to execute the process of determining whether the lane change execution condition is satisfied accurately. According to this aspect of the invention, the condition-determining-target-candidate cubic objects are selected from among the recognized cubic objects existing in the first predetermined area around the own vehicle. Thus, the process of determining whether the lane change execution condition is satisfied, can be executed accurately.

According to further another aspect of the invention, the candidate selection process may include a first candidate sub-selection process, a second candidate sub-selection process, and a third candidate sub-selection process.

In this case, the electronic control unit (90) may be configured to execute the first candidate sub-selection process for determining that the one or more recognized cubic objects existing in a first predetermined area (A1, A2) around the own vehicle (100), satisfy the first condition and selecting the one or more recognized cubic objects determined as satisfying the first condition in executing the first candidate sub-selection process, as the one or more condition-determining-target-candidate cubic objects with the number of the one or more condition-determining-target-candidate cubic objects selected in executing the first candidate sub-selection process being limited to the first predetermined number (see the processes of the steps 1410 and 1430 in FIG. 14).

Further, in this case, the electronic control unit (90) is configured to execute the second candidate sub-selection process for determining that the one or more recognized cubic objects not selected as the one or more condition-determining-target-candidate cubic objects in executing the first candidate sub-selection process, existing in a second predetermined area (A3) outside of the first predetermined area (A1, A2), approaching the own vehicle (100), and having the predicted reaching time (TTC) equal to or shorter than the predetermined predicted reaching time (TTCth_1), satisfy the first condition when the number of the one or more condition-determining-target-candidate cubic objects selected in executing the first candidate sub-selection process is smaller than the first predetermined number (see the determinations "Yes" at the steps 1420 and 1440 in FIG. 14) and selecting the one or more recognized cubic objects determined as satisfying the first condition in executing the second candidate sub-selection process, as the one or more condition-determining-target-candidate cubic objects with the number of the one or more condition-determining-target-candidate cubic objects selected in executing the first candidate sub-selection process and the second candidate sub-selection process being limited to the first predetermined number (see the process of the step 1450 in FIG. 14).

Further, in this case, the electronic control unit (90) is configured to execute the third candidate sub-selection process for determining that the one or more recognized cubic objects not selected as the one or more condition-determining-target-candidate cubic objects in executing the first candidate sub-selection process and the second candidate sub-selection process and existing in the second predetermined area (A3), satisfy the first condition when the number of the one or more condition-determining-target-candidate cubic objects selected in executing the first candidate sub-selection process and the second candidate sub-selection process is smaller than the first predetermined number (see the determination "Yes" at the step 1460 in FIG. 14) and selecting the one or more recognized cubic objects determined as satisfying the first condition in executing the third candidate sub-selection process, as the one or more condition-determining-target-candidate cubic objects with the number of the one or more condition-determining-target-candidate cubic objects selected in executing the first candidate sub-selection process, the second candidate sub-selection process, and the third candidate sub-selection process being limited to the first predetermined number (see the process of the step 1470 in FIG. 14).

As described above, it is desired that the condition-determining-target-candidate cubic objects are selected from among the recognized cubic objects closer to the own vehicle in order to execute the process of determining whether the lane change execution condition is satisfied accurately. According to this aspect of the invention, the condition-determining-target-candidate cubic objects are selected from among the recognized cubic objects existing in the first predetermined area around the own vehicle. Thus, the process of determining whether the lane change execution condition is satisfied, can be executed accurately.

In addition, when the number of the condition-determining-target-candidate cubic objects is limited to the first predetermined number, it is desired that the first predetermined number of the condition-determining-target-candidate cubic objects are selected in order to execute the process of determining whether the lane change execution condition is satisfied accurately. According to this aspect of the invention, the recognized cubic objects not selected as the condition-determining-target-candidate cubic objects in executing the second candidate sub-selection process and existing in the second predetermined area, are selected as the condition-determining-target-candidate cubic objects when the number of the condition-determining-target-candidate cubic objects selected in executing the first and second candidate sub-selection processes, is smaller than the first predetermined number. As a result, the number of the condition-determining-target-candidate cubic objects, increases. Thus, the process of determining whether the lane change execution condition is satisfied, can be executed accurately.

According to further another aspect of the invention, the electronic control unit (90) may be configured to execute the target selection process for determining that the one or more condition-determining-target-candidate cubic objects existing in a third predetermined area around the own vehicle (100), as the one or more condition-determining-target-candidate cubic objects satisfying the second condition and selecting the one or more condition-determining-target-candidate cubic objects determined as satisfying the second condition, as the one or more condition-determining-target cubic objects with the number of the one or more condition-determining-target cubic objects being limited to the second predetermined number.

As described above, it is desired that the condition-determining-target-candidate cubic objects are selected from among the recognized cubic objects closer to the own vehicle in order to execute the process of determining whether the lane change execution condition is satisfied accurately. According to this aspect of the invention, the condition-determining-target-candidate cubic objects are selected from among the recognized cubic objects existing in the third predetermined area around the own vehicle. Thus, the process of determining whether the lane change execution condition is satisfied, can be executed accurately.

According to further another aspect of the invention, the electronic control unit (90) may be configured to execute the candidate selection process in advance of the execution of the lane change assist control being requested.

According to this aspect of the invention, the condition-determining-target-candidate cubic objects are selected in advance of the execution of the lane change assist control being requested. As a result, the condition-determining-target cubic objects are selected quickly when the execution of the lane change assist control is requested. Thus, the process of determining whether the condition-determining-target cubic objects satisfy the lane change execution condition, can be executed quickly.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
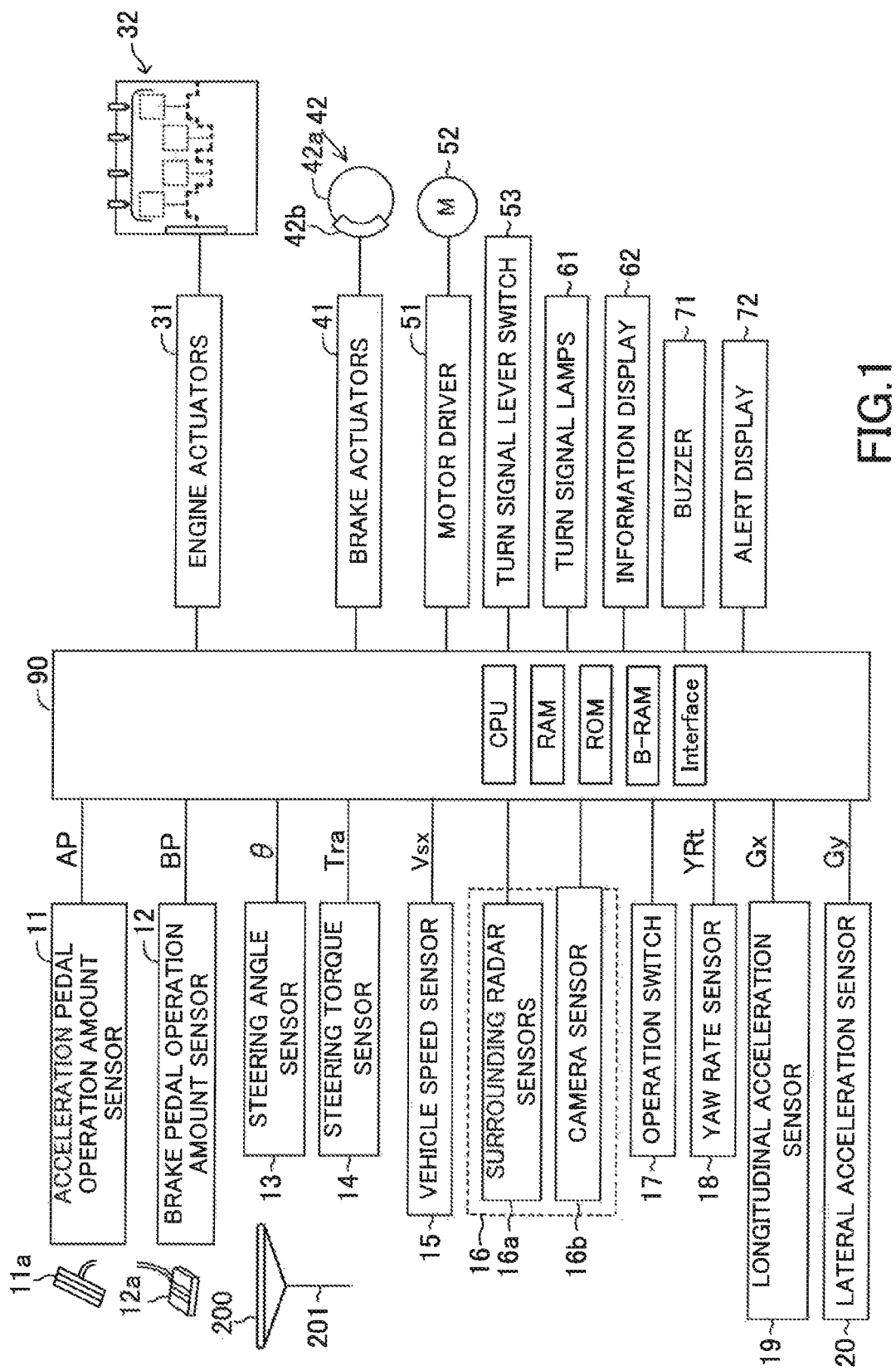
FIG. 1 is a view for showing a vehicle lane change assist apparatus according to an embodiment of the invention.

Below, a vehicle lane change assist apparatus according to an embodiment of the invention, will be described with reference to the drawings. The vehicle lane change assist apparatus according to the embodiment of the invention, includes an ECU 90 shown in FIG. 1 and is applied to a vehicle 100 (see FIG. 2). Hereinafter, the vehicle lane change assist apparatus according to the embodiment of the invention, will be referred to as "the embodiment apparatus". In addition, the vehicle 100, to which the embodiment apparatus is applied, will be referred to as "the own vehicle 100".

The ECU 90 is an electronic control unit which includes a micro-computer as a main component. The ECU 90 includes a CPU, a ROM, a RAM, a non-volatile memory, an interface, etc. The CPU is configured to execute instructions, or programs, or routines stored in the ROM to realize various functions.

An acceleration pedal operation amount sensor 11 is electrically connected to the ECU 90. The acceleration pedal operation amount sensor 11 detects an operation amount AP of an acceleration pedal 11a and sends a signal representing the detected operation amount AP to the ECU 90. The ECU 90 acquires the operation amount AP on the basis of the signal sent from the acceleration pedal operation amount sensor 11.

A brake pedal operation amount sensor 12 is electrically connected to the ECU 90. The brake pedal operation amount sensor 12 detects an operation amount BP of a brake pedal 12a and sends a signal representing the detected operation amount BP to the ECU 90. The ECU 90 acquires the operation amount BP on the basis of the signal sent from the brake pedal operation amount sensor 12.

A steering angle sensor 13 is electrically connected to the ECU 90. The steering angle sensor 13 detects a steering angle θ of a steering wheel 200 and sends a signal representing the steering angle θ to the ECU 90. The ECU 90 acquires the steering angle θ on the basis of the signal sent from the steering angle sensor 13.

A steering torque sensor 14 is electrically connected to the ECU 90. The steering torque sensor 14 detects a steering torque Tra applied to a steering shaft 201 of the own vehicle 100 by an operation of the steering wheel 200 and sends a signal representing the detected steering torque Tra to the ECU 90. The ECU 90 acquires the steering torque Tra on the basis of the signal sent from the steering torque sensor 14.

A vehicle speed sensor 15 is electrically connected to the ECU 90. The vehicle speed sensor 15 detects a moving speed V of the own vehicle 100 in a longitudinal direction of the own vehicle 100 or a longitudinal moving speed V of the own vehicle 100 and sends a signal representing the detected moving speed V to the ECU 90. The ECU 90 acquires the moving speed V as a vehicle speed V on the basis of the signal sent from the vehicle speed sensor 15.

Surrounding sensors 16 including surrounding radar sensors 16a and a camera sensor 16b are electrically connected to the ECU 90. Positions and functions of the surrounding radar sensors 16a and the camera sensor 16b will be described later, respectively.

An operation switch 17 is electrically connected to the ECU 90. The operation switch 17 is an operation device operated by a driver of the own vehicle 100 for selecting whether causing the CPU to execute a following inter-vehicular-distance control or a lane keeping control described later, respectively. The operation switch 17 sends a signal representing the selected one of the following inter-vehicle distance control and the lane keeping control, depending on the operation of the operation switch 17 by the driver. In addition, the driver can input or select his/her requests to be accomplished by the ECU 90 in the following inter-vehicle distance control and the lane keeping control by operating the operation switch 17.

A yaw rate sensor 18 is electrically connected to the ECU 90. The yaw rate sensor 18 detects a yaw rate TRt of the own vehicle 100 and sends a signal representing the detected yaw rate TRt to the ECU 90. The ECU 90 acquires the yaw rate YRt on the basis of the signal sent from the yaw rate sensor 18.

A longitudinal acceleration sensor 19 is electrically connected to the ECU 90. A longitudinal acceleration sensor 19 detects a longitudinal acceleration Gx of the own vehicle 100 and sends a signal representing the detected longitudinal acceleration Gx to the ECU 90. The ECU 90 acquires the longitudinal acceleration Gx on the basis of the signal sent from the longitudinal acceleration sensor 19.

A lateral acceleration sensor 20 is electrically connected to the ECU 90. The lateral acceleration sensor 20 detects an acceleration Gy of the own vehicle 100 in a lateral or width direction of the own vehicle 100 or a direction orthogonal to a longitudinal center line of the own vehicle 100 and sends a signal representing the detected acceleration Gy to the ECU 90. The ECU 90 acquires the acceleration Gy on the basis of the signal sent from the lateral acceleration sensor 20.

<Surrounding Radar Sensors>

Figure 2:
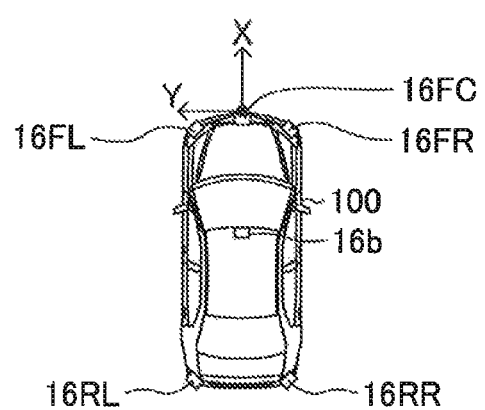
FIG. 2 is a top view for showing an own vehicle with surrounding radar sensors shown in FIG. 1.

As shown in FIG. 2, the surrounding radar sensors 16a are a central front surrounding sensor 16FC, a front right surrounding sensor 16FR, a front left surrounding sensor 16FL, a rear right surrounding sensor 16RR, and a rear left surrounding sensor 16RL. These sensors 16FC, 16FR, 16FL, 16RR, and 16RL are the same. In the description below, the surrounding radar sensors 16a means the sensors 16FC, 16FR, 16FL, 16RR, and 16RL collectively.

Each of the surrounding radar sensors 16a has a radar transmitting/receiving section (not shown) and a signal processing section (not shown).

Figure 3:
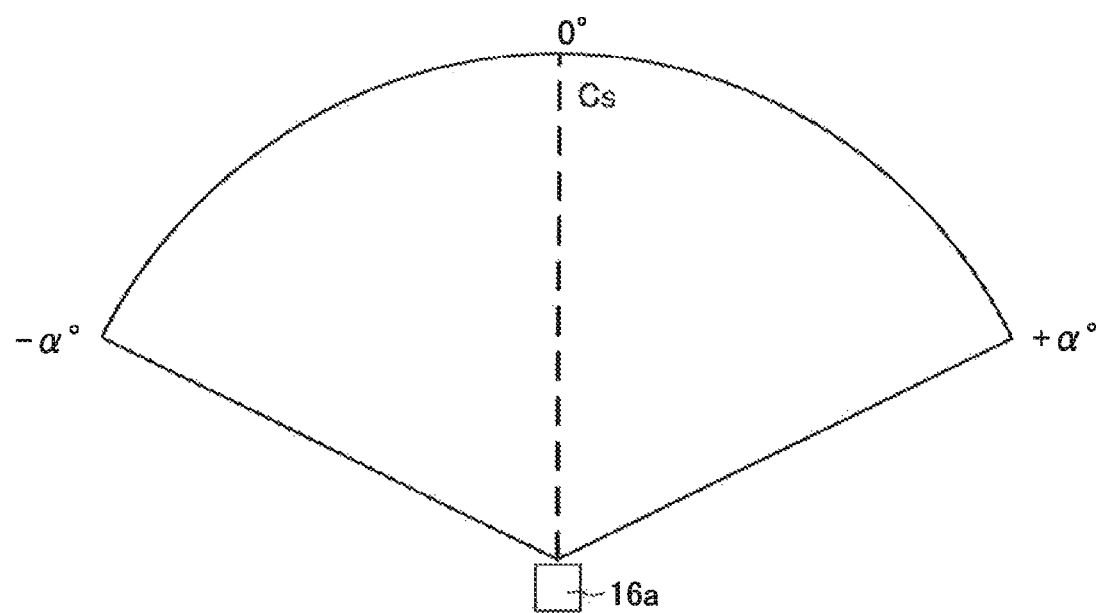
FIG. 3 is a view for showing a detection area of each of the surrounding radar sensors shown in FIG. 1.

As shown in FIG. 3, the radar transmitting/receiving section transmits a radar wave or a millimeter wave which is a radio wave of millimeter band to a transmitted range of a predetermined angle $|\alpha|°$ in a lateral direction with respect to a transmitting center axis Cs. In addition, each of the surrounding radar sensors 16a receives the millimeter wave reflected by a cubic object such as another vehicle, a walking person, a bicycle, a building, etc. existing within the transmitting range as a reflected wave. Below, each of points of the cubic object which reflects the millimeter wave, will be referred to as "the reflection point".

The signal processing section detects a distance between the own vehicle 100 and the reflected point, a relative speed between the own vehicle 100 and the reflected point, and an orientation of the reflected point relative to the own vehicle 100 on the basis of a difference in a phase between the transmitted millimeter wave and the reflected wave, a difference in a frequency between the transmitted millimeter wave and the reflected wave, a decreasing level of the reflected wave, and a time taken for the transmitted wave to be received by the surrounding radar sensors 16a as the reflected wave. The orientation of the reflected point relative to the own vehicle 100 is defined by an angle between the longitudinal center line of the own vehicle 100 and a line extending from a central point of a front end of the own vehicle 100 in the width direction of the own vehicle 100 toward the reflected point. The orientation is positive when the reflected point is located on the left side of the longitudinal center line of the own vehicle 100. On the other hand, the orientation is negative when the reflected point is located on the right side of the longitudinal center line of the own vehicle 100.

Each of the surrounding radar sensors 16a may be a radar sensor which uses a radio-wave or a radar wave of a frequency band other than the millimeter band.

The central front surrounding sensor 16FC is provided at a front center part of the own vehicle 100. The central front surrounding sensor 16FC detects the reflection points existing in an area ahead of the own vehicle 100. In particular, the central front surrounding sensor 16FC transmits the millimeter wave to a detection area AFC and detects the reflection points existing in the detection area AFC on the basis of the reflected waves. The detection area AFC corresponds to a range of ±75 degrees with respect to a line extending frontward from the front center part of the own vehicle 100.

The front right surrounding sensor 16FR is provided at a front right corner part of the own vehicle 100. The front right surrounding sensor 16FR mainly detects the reflection points existing in an area ahead of the own vehicle 100 on the right. In particular, the front right surrounding sensor 16FR transmits the millimeter wave to a detection area AFR and detects the reflection points existing in the detection area AFR on the basis of the reflected waves. The detection area AFR corresponds to a range of ±75 degrees with respect to a line extending diagonally frontward right from the front right corner of the own vehicle 100.

A part of the detection area AFR of the front right surrounding sensor 16FR overlaps a part of the detection area AFC of the central front surrounding sensor 16FC. In other words, the front right surrounding sensor 16FR and the central front surrounding sensor 16FC commonly have an overlapped detection area.

The front left surrounding sensor 16FL is provided at a front left corner part of the own vehicle 100. The front left surrounding sensor 16FL mainly detects the reflection points existing in an area ahead of the own vehicle 100 on the left. In particular, the front left surrounding sensor 16FL transmits the millimeter wave to a detection area AFL and detects the reflection points existing in the detection area AFL on the basis of the reflected waves. The detection area AFL corresponds to a range of ±75 degrees with respect to a line extending diagonally frontward left from the front left corner of the own vehicle 100.

A part of the detection area AFL of the front left surrounding sensor 16FL overlaps a part of the detection area AFC of the central front surrounding sensor 16FC. In other words, the front left surrounding sensor 16FL and the central front surrounding sensor 16FC commonly have an overlapped detection area.

The detection area AFR of the front right surrounding sensor 16FR and the detection area AFL of the front left surrounding sensor 16FL are symmetric with respect to the longitudinal center line of the own vehicle 100. The detection area AFR of the front right surrounding sensor 16FR and the detection area AFL of the front left surrounding sensor 16FL are overlapped in a central area ahead of the own vehicle 100. In particular, the front right surrounding sensor 16FR and the front left surrounding sensor 16FL commonly have an overlapped detection area as shown by a gray-colored portion of FIG. 4.

The rear right surrounding sensor 16RR is provided at a rear right corner part of the own vehicle 100. The rear right surrounding sensor 16RR mainly detects the reflection points existing in a rear right area with respect to the own vehicle 100. In particular, the rear right surrounding sensor 16RR transmits the millimeter wave to a detection area ARR and detects the reflection points existing in the detection area ARR on the basis of the reflected waves. The detection area ARR corresponds to a range of ±75 degrees with respect to a line extending diagonally rearward right from the rear right corner of the own vehicle 100.

The rear left surrounding sensor 16RL is provided at a rear left corner part of the own vehicle 100. The rear left surrounding sensor 16RL mainly detects the reflection points existing in a rear left area with respect to the own vehicle 100. In particular, the rear left surrounding sensor 16RL transmits the millimeter wave to a detection area ARL and detects the reflection points existing in the detection area ARL on the basis of the reflected waves. The detection area ARL corresponds to a range of ±75 degrees with respect to a line extending diagonally rearward left from the rear left corner of the own vehicle 100.

The detection area ARR of the rear right surrounding sensor 16RR and the detection area ARL of the rear left surrounding sensor 16RL are symmetric with respect to the longitudinal center line of the own vehicle 100. The detection area ARR of the rear right surrounding sensor 16RR and the detection area ARL of the rear left surrounding sensor 16RL are overlapped in a central area behind the own vehicle 100. In particular, the rear right surrounding sensor 16RR and the rear left surrounding sensor 16RL commonly have an overlapped detection area as shown by a gray-colored portion of FIG. 4.

The detection area AFR of the front right surrounding sensor 16FR and the detection area ARR of the rear right surrounding sensor 16RR are overlapped in a middle area at the right side of the own vehicle 100. In particular, the front right surrounding sensor 16FR and the rear right surrounding sensor 16RR commonly have an overlapped detection area as shown by a gray-colored portion of FIG. 4.

The detection area AFL of the front left surrounding sensor 16FL and the detection area ARL of the rear left surrounding sensor 16RL are overlapped in a middle area at the left side of the own vehicle 100. In particular, the front left surrounding sensor 16FL and the rear left surrounding sensor 16RL commonly have an overlapped detection area as shown by a gray-colored portion of FIG. 4.

Figure 4:
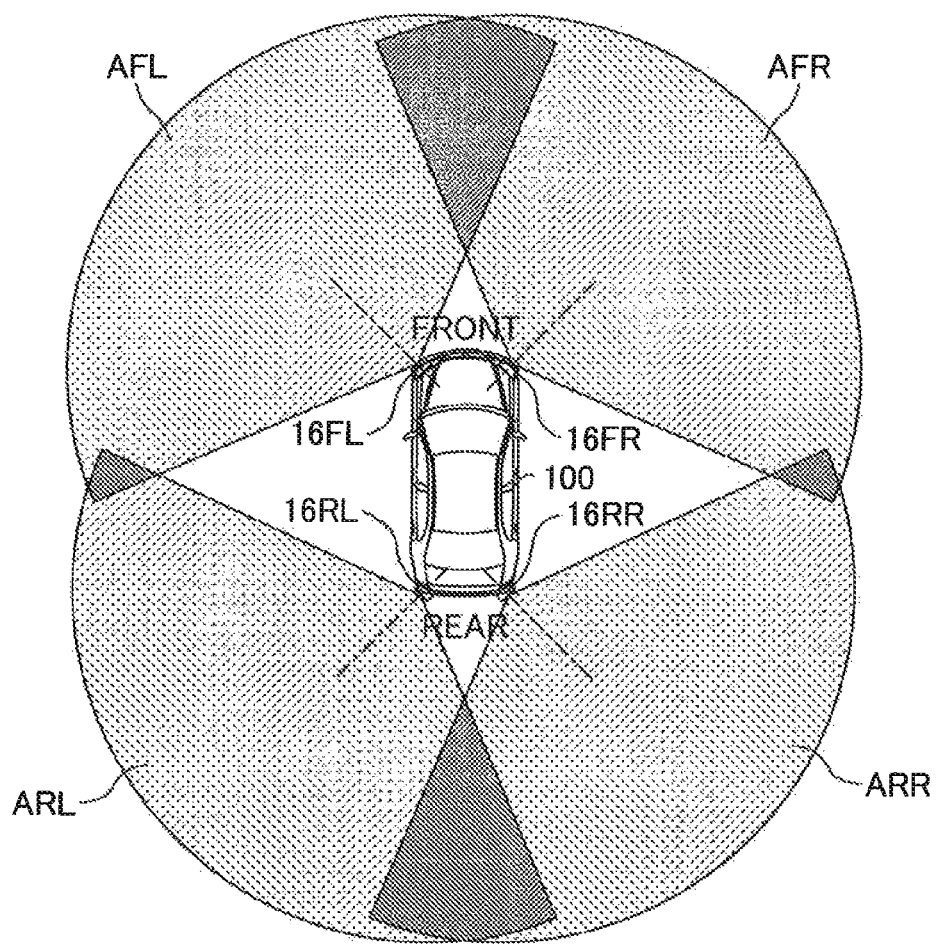
FIG. 4 is a view for showing the surrounding radar sensors shown in FIG. 1.

Each of the surrounding radar sensors 16a detects the reflection points within a range of approximately 100 meters from the own vehicle 100. In FIG. 4, a detection angle range of each of the front right surrounding sensor 16FR, the front left surrounding sensor 16FL, the rear right surrounding sensor 16RR, and the rear left surrounding sensor 16RL is shown, but a detection distance of each of the front right surrounding sensor 16FR, the front left surrounding sensor 16FL, the rear right surrounding sensor 16RR, and the rear left surrounding sensor 16RL is not shown. The detection distance may be appropriately determined, depending on purposes of using the surrounding radar sensors 16a. For example, the detection distance may be several tens of meters.

As shown in FIG. 2, the ECU 90 has an X-Y coordinate system. An X-axis of the X-Y coordinate system extends along the longitudinal center line of the own vehicle 100. An X-coordinate of the X-Y coordinate system representing a point in front of the own vehicle 100, is positive. A Y-axis of the X-Y coordinate system is orthogonal to the X-axis. A Y-coordinate of the X-Y coordinate system representing a point on the left side of the own vehicle 100, is positive. An origin point of the X-Y coordinate system is located at the central point of the front end of the own vehicle 100 in the width direction of the own vehicle 100.

Each of the surrounding radar sensors 16a detects an identification information ID on the reflection point and physical amounts of the reflected wave such as the value Px on the X-axis representing the reflection point, the value Py on the Y-axis representing the reflection point, a longitudinal relative speed Vx of the reflection point relative to the own vehicle 100, a lateral relative speed Vy of the reflection point relative to the own vehicle 100, a strength of the reflected wave of the reflection point, etc. Then, each of the surrounding radar sensors 16a sends signals representing the identification information ID on the reflection point and the physical amounts of the reflected wave as cubic object information or reflection point information to the ECU 90.

An X-coordinate of the reflection point represents a distance between the own vehicle 100 and the reflection point in a direction of the X-axis and a longitudinal position of the reflection point with respect to the own vehicle 100. A Y-coordinate of the reflection point represents a distance between the own vehicle 100 and the reflection point in a direction of the Y-axis and a lateral position of the reflection point with respect to the own vehicle 100. The longitudinal relative speed Vx is the moving speed of the reflection point relative to the own vehicle 100 in the direction of the X-axis. It should be noted that an absolute longitudinal speed Vx_abs described later is a value acquired by adding the vehicle speed V of the own vehicle 100 to the longitudinal relative speed Vx (Vx_abs=Vx+V). The lateral relative speed Vy is the moving speed of the reflection point relative to the own vehicle 100 in the direction of the Y-axis. It should be noted that an absolute lateral speed Vy_abs described later is the same as the lateral relative speed Vy (Vy_abs=Vy). The identification information ID is information used for identifying or specifying the reflection point.

The ECU 90 acquires the information on the reflection point as the reflection point information on the basis of the signals sent from the surrounding radar sensors 16a.

<Camera Sensor>

The camera sensor 16b includes a camera section (not shown) and a lane recognition section (not shown). The camera section has a stereo camera. The lane recognition section analyzes data of images taken by the camera section to recognize lane markings on a road, on which the own vehicle 100 moves. The camera section of the camera sensor 16b takes the images of a view in front of the own vehicle 100. The lane recognition section of the camera sensor 16b analyzes the data of the images of an image processing area having a predetermined angle range extending in front of the own vehicle 100 to recognize or detect the lane markings provided on the road in front of the own vehicle 100.

Figure 5:
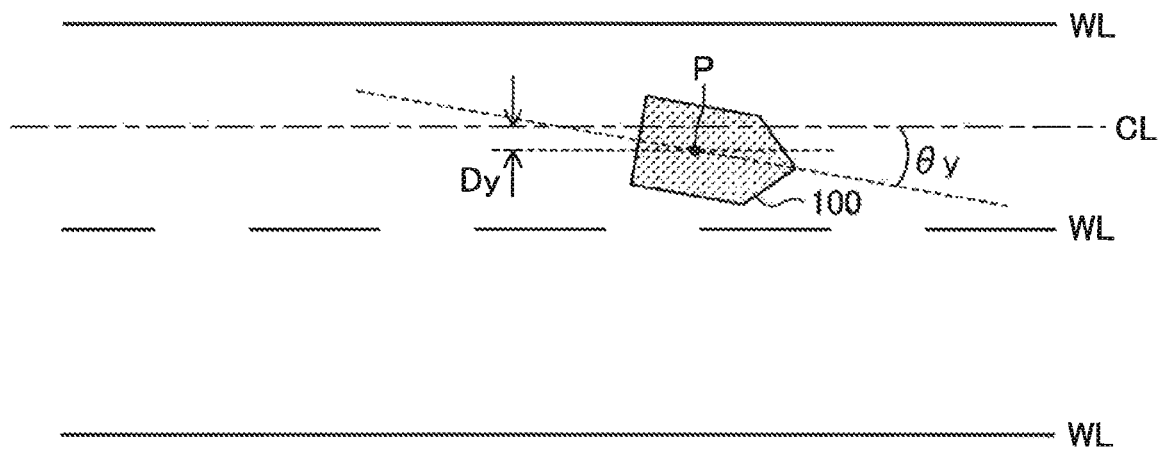
FIG. 5 is a view used for describing functions of a camera sensor.

The camera sensor 16b sends information on the recognized lane markings to the ECU 90. As shown in FIG. 5, the ECU 90 specifies a center line CL on the basis of the information on the recognized lane markings sent from the camera sensor 16b. The center line CL is a line defined by center points between right and left lane markings of a lane, on which the own vehicle 100 moves in the width direction of the own vehicle 100. The center line CL is used as a target moving line in the lane keeping control described later. Further, the ECU 90 calculates a curvature Cu of a curve of the center line CL. In this embodiment, the curvature Cu takes a positive value when the center line curves to the right. On the other hand, the curvature Cu takes a negative value when the center line curves to the left. Hereinafter, the center line CL will be referred to as "the moving lane center line CL", and the lane, on which the own vehicle 100 moves, will be referred to as "the moving lane".

In addition, the ECU 90 calculates a position of the own vehicle 100 and an orientation of the own vehicle 100 in the moving lane. For example, as shown in FIG. 5, the ECU 90 calculates a distance Cy between a reference point P of the own vehicle 100 and the center line CL in a width direction of the road, on which the own vehicle 100 moves. The reference point P of the own vehicle 100 is, for example, a gravity center of the own vehicle 100. The distance Dy represents an amount of a deflection of the own vehicle 100 with respect to the center line CL in the width direction of the road. The distance Dy takes a positive value when the reference point P of the own vehicle 100 deviates from the center line CL to the right in the width direction of the road. On the other hand, the distance Dy takes a negative value when the reference point P of the own vehicle 100 deviates from the center line CL to the left in the width direction of the road. Hereinafter, the distance Dy will be referred to as "the lateral deviation Dy".

The ECU 90 calculates an angle θy defined by an extending direction of the lane center line CL and an orientation of the own vehicle 100, i.e., the longitudinal direction of the own vehicle 100. Hereinafter, the angle θy will be referred to as "the yaw angle θy". The yaw angle θy takes a positive value when the own vehicle 100 is oriented to the right with respect to the lane center line CL. On the other hand, the yaw angle θy takes a negative value when the own vehicle 100 is oriented to the left with respect to the lane center line CL. In the description below, information (Cu, Dy, Oy) on the curvature Cu, the lateral deviation Dy, and the yaw angle θy, will be referred to as "the moving lane-related vehicle information".

The camera sensor 16b sends to the ECU 90, information on a type of the lane marking on the right side of the own vehicle 100 (for example, whether the lane marking is a solid line or a chain line), a type of the lane marking on the left side of the own vehicle 100 (for example, whether the lane marking is a solid line or a chain line), a shape of the lane marking on the right side of the own vehicle 100, a shape of the lane marking on the left side of the own vehicle 100, etc. In addition, the camera sensor 16b sends to the ECU 90, information on types of the lane markings for lanes next to the moving lane of the own vehicle 100, shapes of the lane markings for the lanes next to the moving lane of the own vehicle 100, etc. As described above, the camera sensor 16b sends the information on the lane markings to the ECU 90. The lane marking having the solid line forbids that the vehicle moves across the lane marking in question to change the moving lane. On the other hand, the lane marking having the chain line permits that the vehicle moves across the lane marking in question to change the moving lane.

Engine actuators 31 are electrically connected to the ECU 90. The engine actuators 31 include actuators for changing an operation state of an internal combustion engine 32. In this embodiment, the internal combustion engine 32 is a gasoline-fuel-injection spark-ignition multi-cylinder type engine. The internal combustion engine 32 includes a throttle valve for adjusting an amount of an intake air. The engine actuators 31 include a throttle valve actuator for changing an opening degree of the throttle valve. The ECU 90 can change a torque generated by the internal combustion engine 32 by controlling activations of the engine actuators 31. The torque generated by the internal combustion engine 32 is transmitted to driving wheels (not shown) via a transmission (not shown). Therefore, the ECU 90 can change an acceleration of the own vehicle 100 by controlling the activations of the engine actuators 31 to control a driving force applied to the own vehicle 100.

Brake actuators 41 are electrically connected to the ECU 90. Each of the brake actuators 41 adjusts a hydraulic pressure applied to a wheel cylinder incorporated in a brake caliper 42b of a friction brake mechanism 42 in response to a command sent from the ECU 90, thereby pressing a brake pad to a brake disc 42a by the applied hydraulic pressure to apply a friction braking force to the brake disc 42a. Therefore, the ECU 90 can change the acceleration of the own vehicle 100, in particular, a deceleration of the own vehicle 100 by controlling activations of the brake actuators 41 to control braking forces applied to the own vehicle 100.

A motor driver 51 as a control device of a known electric power steering system, is electrically connected to the ECU 90. The motor driver 51 is electrically connected to a steering motor 52. The steering motor 52 is incorporated in a steering mechanism of the own vehicle 100 including the steering wheel 200, the steering shaft 201 operatively connected to the steering wheel 200, a steering gear mechanism, etc. The steering motor 52 generates a torque, using electric power supplied from the motor driver 51 and applies the generated torque to the steering shaft 201 as a steering assist torque and steers right and left steered wheels of the own vehicle 100. As can be understood from the above, the steering motor 52 can change a steering angle of the own vehicle 100, in particular, a steering angle of each of the steered wheels.

A turn signal lever switch 53 is electrically connected to the ECU 90. The turn signal lever switch 53 detects an operated position of a turn signal lever (not shown). The turn signal lever is a lever operated by the driver of the own vehicle 100 for blinking turn-signal lamps 61.

The turn signal lever is provided on a steering column (not shown). The driver of the own vehicle 100 can sets the turn signal lever to any of a first clockwise position and a second clockwise position. The first clockwise position is a position that the turn signal lever is turned by a predetermined angle clockwise from an initial position. The second clockwise position is a position that the turn signal lever is turned by the predetermined angle clockwise from the first clockwise position. The driver needs to apply an operation to the turn signal lever in order to maintain the turn signal lever at the first clockwise position. Therefore, the turn signal lever returns to the initial position from the first clockwise position when the driver releases the turn signal lever. When the turn signal lever is maintained at the first clockwise position, the turn signal lever switch 53 sends to the ECU 90, a signal representing that the turn signal lever is maintained at the first clockwise position.

Further, the driver of the own vehicle 100 can sets the turn signal lever to any of a first counterclockwise position and a second counterclockwise position. The first counterclockwise position is a position that the turn signal lever is turned by the predetermined angle counterclockwise from the initial position. The second counterclockwise position is a position that the turn signal lever is turned by the predetermined angle counterclockwise from the first counterclockwise position. The driver needs to apply the operation to the turn signal lever in order to maintain the turn signal lever at the first counterclockwise position. Therefore, the turn signal lever returns to the initial position from the first counterclockwise position when the driver releases the turn signal lever. When the turn signal lever is maintained at the first counterclockwise position, the turn signal lever switch 53 sends to the ECU 90, a signal representing that the turn signal lever is maintained at the first counterclockwise position.

The turn signal lever is described, for example, in JP 2005-138647 A.

The ECU 90 measures a time that the turn signal lever continues to be maintained at the first clockwise position on the basis of the signal sent from the turn signal lever switch 53. The ECU 90 determines that an execution of the lane change assist control is requested by the driver for moving the own vehicle 100 from the present moving lane to a next lane next to the present moving lane on the right side of the present moving lane when the measured time in question becomes equal to or longer than a predetermined assist request fixed time (for example, 0.8 seconds). The present moving lane is a lane, on which the own vehicle 100 moves at the present.

In addition, the ECU 90 measures a time that the turn signal lever continues to be maintained at the first counterclockwise position on the basis of the signal sent from the turn signal lever switch 53. The ECU 90 determines that the execution of the lane change assist control is requested by the driver for moving the own vehicle 100 from the present moving lane to a next lane next to the present moving lane on the left side of the present moving lane when the measured time in question becomes equal to or longer than the predetermined assist request fixed time.

The right and left turn signal lamps 61 or right and left blinking lamps are electrically connected to the ECU 90. The ECU 90 blinks any of the right and left turn signal lamps 61 via a turn signal drive circuit (not shown) in response to the signal sent from the turn signal lever switch 53. When the turn signal lever switch 53 outputs the signal representing that the turn signal lever is maintained at the first counterclockwise position, the ECU 90 blinks the left turn signal lamps 61. On the other hand, when the turn signal lever switch 53 outputs the signal representing that the turn signal lever is maintained at the first clockwise position, the ECU 90 blinks the right turn signal lamps 61.

An information display 62 is electrically connected to the ECU 90. The information display 62 is a multi-information display provided in front of a driver seat of the own vehicle 100. The information display 62 displays measured values such as the vehicle speed V, an engine speed of the internal combustion engine 32, etc. and various information. For example, the ECU 90 causes the information display 62 to display images, depending on a driving assist condition.

A buzzer 71 and an alert display 72 are electrically connected to the ECU 90. The ECU 90 activates the buzzer 71 to alert the driver. In addition, the ECU 90 causes the alert display 72 to display alert marks (for example, warning lamps), alert images, alert messages, and an execution condition of the driving assist control. The alert display 72 is a head-up display. In this regard, the alert display 72 may be a display other than the head-up display.

<Summary of Operation of Embodiment Apparatus>

Next, a summary of an operation of the embodiment apparatus will be described. The embodiment apparatus is configured to execute any of the following inter-vehicle distance control, the lane keeping control, and the lane change assist control in response to a request by the driver of the own vehicle 100.

<Following Inter-Vehicle Distance Control>

The following inter-vehicle distance control is a control for causing the own vehicle 100 to follow another vehicle moving in front of the own vehicle 100 (i.e., a preceding vehicle moving immediately in front of the own vehicle 100), maintaining an inter-vehicle distance between the own vehicle 100 and the preceding vehicle at a predetermined distance. The following inter-vehicle distance control is described, for example, in JP 2014-148293 A, JP 2006-315491 A, JP 4172434 B, JP 4929777 B, etc. In this embodiment, the embodiment apparatus is configured to execute the following inter-vehicle distance control when an execution of the following inter-vehicle distance control is requested by the driver operating the operation switch 17. Hereinafter, the other vehicle moving in front of the own vehicle 100 in executing the following inter-vehicle distance control, will be referred to as "the following target vehicle".

<Lane Keeping Control>

The lane keeping control is a control for assisting a driving operation of the driver of the own vehicle 100 by applying the steering torque to the steering mechanism to control the steering angle of the own vehicle 100 so as to maintain a position of the own vehicle 100 at around the target moving line (for example, the center line CL of the moving lane of the own vehicle 100). The lane keeping control is described, for example, in JP 2008-195402 A, JP 2009-190464 A, JP 2010-6279 A, JP 4349210 B, etc. In this embodiment, the embodiment apparatus is configured to execute the lane keeping control when an execution of the lane keeping control is requested by the driver operating the operation switch 17 while the embodiment apparatus executes the following inter-vehicle distance control.

<Lane Change Assist Control>

The lane change assist control is a control for applying the steering torque to the steering mechanism to change the steering angle of the own vehicle 100 to move the own vehicle 100 from the present moving lane to a target next lane. Thereby, the lane change assist control is a control for assisting a steering operation of the driver of the own vehicle 100, in particular, an operation of the driver to the steering wheel 200 for moving the own vehicle 100 from the present moving lane to the target next lane. The target next lane is a lane next to the present moving lane, which the driver of the own vehicle 100 desires to move the own vehicle 100. The lane change assist control is described, for example, in JP 2016-207060 A, JP 2017-74823 A, etc.

In this embodiment, the embodiment apparatus executes the lane change assist control when the execution of the lane change assist control is requested by the driver operating the turn signal lever while the embodiment apparatus executes the lane keeping control, and a situation around the own vehicle 100 permits the execution of the lane change assist control. On the other hand, the embodiment apparatus does not execute the lane change assist control, that is, the execution of the lane change assist control is forbidden when the situation around the own vehicle 100 does not permit the execution of the lane change assist control even when the execution of the lane change assist control is requested.

In this embodiment, a condition for permitting the execution of the lane change assist control is a condition that there is no cubic object such as the other vehicle which the own vehicle 100 may contact while the own vehicle 100 is caused to move to the target next lane by the lane change assist control.

The embodiment apparatus uses the cubic object information on cubic objects existing around the own vehicle 100 to determine whether the situation around the own vehicle 100 satisfies the condition for permitting the execution of the lane change assist control. Accordingly, the embodiment apparatus acquires the cubic object information as described below. Hereinafter, a process of determining whether the situation around the own vehicle 100 satisfies the condition for permitting the execution of the lane change assist control, will be referred to as "the lane change execution condition determination process".

For example, the embodiment apparatus executes the lane change execution condition determination process when the execution of the lane change assist control is requested. In this regard, the embodiment apparatus may be configured to execute the lane change execution condition determination process before the execution of the lane change assist control is requested.

<Cubic Object Information>

As described above, the embodiment apparatus acquires the reflection point information on the basis of the signals output from the surrounding radar sensors 16a. One cubic object may have only one reflection point. On the other hand, one cubic object may have two or more reflection points. When one cubic object has two or more reflection points, each of the surrounding radar sensors 16a detects the reflection points of one cubic object. Further, two or more surrounding radar sensors 16a detects the same reflection points of one cubic object.

Accordingly, the embodiment apparatus executes a fusion process for grouping or integrating the reflection points of one cubic object to acquire a fusion object FS represented by the reflection points. The embodiment apparatus recognizes one fusion object FS as one cubic object and acquires information on the recognized fusion object FS as the cubic object information.

The fusion process is executed as described below. The fusion process includes an object update process and an object production process. The object update process is a process for integrating one or more reflection points Pref into the fusion object FS produced previously to update the fusion object FS. The object production process is a process for integrating the reflection points Pref together to produce a new fusion object FS.

Figure 6:
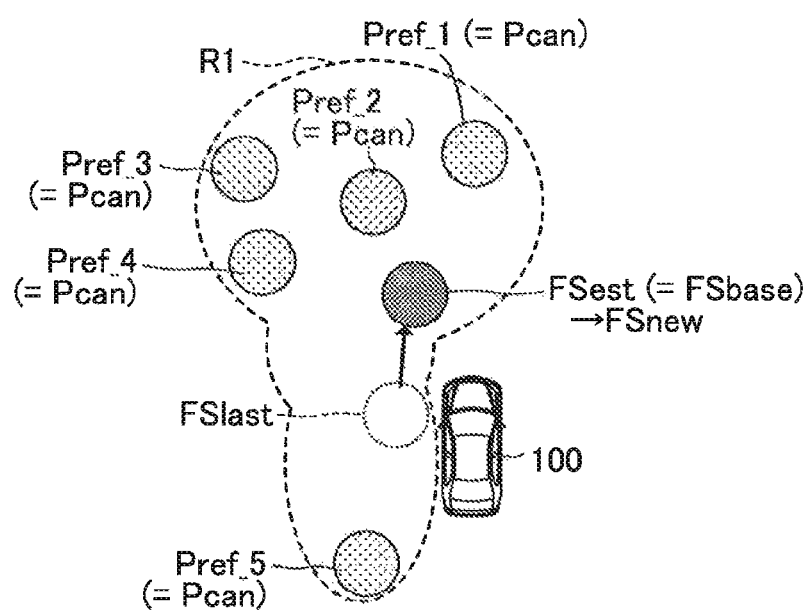
FIG. 6 is a view used for describing a fusion process.

As shown in FIG. 6, in executing the object update process this time, the embodiment apparatus acquires information on the fusion object FS produced or updated in executing the fusion process the last time. Hereinafter, the fusion object FS produced or updated in executing the fusion process the last time, will be referred to as "the last time fusion object FSlast", and the information on the last time fusion object FSlast in executing the fusion process the last time, will be referred to as "the last time information on the last time fusion object FSlast". The embodiment apparatus estimates the information on the last time fusion object FSlast at the present time as present information on the last time fusion object FSlast on the basis of the last time information on the last time fusion object FSlast. Then, the embodiment apparatus estimates the last time fusion object FSlast at the present time on the basis of the present information on the last time fusion object FSlast. Then, the embodiment apparatus recognized the estimated last time fusion object FSlast as an estimated fusion object FSest.

In particular, the embodiment apparatus calculates the present X-coordinate Px of the last time fusion object FSlast as an X-coordinate Px_est, using an equation (1) described below, the last time X-coordinate Px (=Px_last) of the last time fusion object FSlast, the last time longitudinal relative speed Vx (=Vx_last) of the last time fusion object FSlast, and a predetermined time Δt corresponding to a calculation cycle. The X-coordinate Px_est calculated this time is the X-coordinate Px of the last time fusion object FSlast at the present time in the X-Y coordinate system used in executing the fusion process last time. Hereinafter, the X-Y coordinate system used in executing the fusion process last time, will be referred to as "the last time X-Y coordinate system".

$$Px\_est = Px\_last + \Delta t * Vx\_last \quad (1)$$

In addition, the embodiment apparatus calculates the present Y-coordinate Py of the last time fusion object FSlast as an Y-coordinate Py_est, using an equation (2) described below, the last time Y-coordinate Py (=Py_last) of the last time fusion object FSlast, the last time lateral relative speed Vy (=Vy_last) of the last time fusion object FSlast, and the predetermined time Δt. The Y-coordinate Py_est calculated this time is the Y-coordinate Py of the last time fusion object FSlast at the present time in the last time X-Y coordinate system.

$$Py\_est = Py\_last + \Delta t * Vy\_last \quad (2)$$

The embodiment apparatus executes a coordinate conversion process for converting the calculated X-coordinate Px_est and the calculated Y-coordinate Py_est to an X-coordinate Px_con and a Y-coordinate Py_con, respectively in the X-Y coordinate system at the present time. The X-coordinate Px_con and the Y-coordinate Py_con are the X-coordinate Px and the Y-coordinate Py of the last time fusion object FSlast in the X-Y coordinate system at the present time. Hereinafter, the X-Y coordinate system at the present time, will be referred to as "the present X-Y coordinate system". The embodiment apparatus sets the X-coordinate Px_con and the Y-coordinate Py_con as the X-coordinate Px_new and the Y-coordinate Py_new, respectively. The X-coordinate Px_new and the Y-coordinate Py_new are the X-coordinate Px and the Y-coordinate Py of the estimated fusion object FSest in the present X-Y coordinate system.

In addition, the embodiment apparatus executes the coordinate conversion process for converting the last time longitudinal relative speed Vx_last of the last time fusion object FSlast and the last time lateral relative speed Vy_last of the last time fusion object FSlast to a converted longitudinal relative speed Vx_con and a converted lateral relative speed Vy_con, respectively in the present X-Y coordinate system. The converted longitudinal relative speed Vx_con and the converted lateral relative speed Vy_con are the longitudinal relative speed Vx and the lateral relative speed Vy of the last time fusion object FSlast in the present X-Y coordinate system. The embodiment apparatus sets the converted longitudinal relative speed Vx_con and the converted lateral relative speed Vy_con as the longitudinal relative speed Vx_new and the lateral relative speed Vy_new, respectively. The longitudinal relative speed Vx_new and the lateral relative speed Vy_new are the longitudinal relative speed Vx and the lateral relative speed Vy of the estimated fusion object FSest in the present X-Y coordinate system.

The embodiment apparatus recognizes a relationship between the last time X-Y coordinate system and the present X-Y coordinate system on the basis of the vehicle speed V of the own vehicle 100, the lateral deviation Dy of the own vehicle 100, the yaw rate Oy of the own vehicle 100, and the predetermined time Δt. The embodiment apparatus executes the coordinate conversion process, using the recognized relationship.

In addition, the embodiment apparatus acquires a length Llast of the last time fusion object FSlast and a width Wlast of the last time fusion object FSlast as a length Lest of the estimated fusion object FSest and a width West of the estimated fusion object FSest, respectively.

The embodiment apparatus recognizes a cubic object defined by the X-coordinate Px_new, the Y-coordinate Py_new, the longitudinal relative speed Vx_new, the lateral relative speed Vy_new, the length Lest, and the width West as the estimated fusion object FSest.

Then, the embodiment apparatus executes a selection process for selecting the estimated fusion object FSest as a base fusion object FSbase and selecting the one or more reflection points Pref which are candidates to be integrated to the base fusion object FSbase, as one or more candidate reflection points Pcan. The embodiment apparatus selects the one or more reflection points Pref as the one or more candidate reflection points Pcan on the basis of a position of the base fusion object FSbase. In particular, in selecting the one or more reflection points Pref as the one or more candidate reflection points Pcan, the embodiment apparatus selects the one or more reflection points Pref existing in a grouping target area defined on the basis of the position of the base fusion object FSbase, as the one or more candidate reflection points Pcan.

In an example shown in FIG. 6, the one or more candidate reflection points Pcan are the reflection points Pref_1 to Pref_5 existing in the grouping target area enclosed by a dotted line R1.

The embodiment apparatus determines whether the one or more candidate reflection points Pcan satisfies a condition G1 described below and a condition G2 described below with respect to the base fusion object FSbase. A predetermined longitudinal distance ΔDx_th used in the condition G1 is a value "L1*0.5+α". A predetermined longitudinal distance ΔDy_th used in the condition G2 is a value "W1*0.5+β". The parameter L1 is a length of the base fusion object FSbase. The parameter W1 is a width of the base fusion object FSbase. The parameters α and β are appropriately-set arbitrary constant values, respectively.

<Condition G1>

The condition G1 is a condition that an absolute value ΔDx of a difference between the X-coordinate Px (=Px_can) of the candidate reflection point Pcan and the X-coordinate Px (=Px_base) of the base fusion object FSbase (ΔDx=|Px_can−Px_base|), is equal to or smaller than the predetermined longitudinal distance ΔDx_th, and an absolute value ΔDy of a difference between the Y-coordinate Py (=Py_can) of the candidate reflection point Pcan and the Y-coordinate Py (=Py_base) of the base fusion object FSbase (ΔDy=|Py_can−Py_base|), is equal to or smaller than the predetermined lateral distance ΔDy_th.

<Condition G2>

The condition G2 is a condition that an absolute value ΔVx of a difference between the longitudinal relative speed Vx (=Vx_can) of the candidate reflection point Pcan and the longitudinal relative speed Vx (=Vx_base) of the base fusion object FSbase (ΔVx=|Vx_can−Vx_base|), is equal to or smaller than a predetermined longitudinal speed difference ΔVx_th, and an absolute value ΔVy of a difference between the lateral relative speed Vy (=Vy_can) of the candidate reflection point Pcan and the lateral relative speed Vy (=Vy_base) of the base fusion object FSbase (ΔVy=|Vy_can−Vy_base|), is equal to or smaller than a predetermined lateral speed difference ΔVy_th.

The embodiment apparatus may be configured to determine whether the condition G2 is satisfied, using an absolute longitudinal speed Vx_abs_can and an absolute lateral speed Vy_abs_can of the candidate reflection point Pcan. In particular, the condition G2 may be a condition that an absolute value ΔVx_abs of a difference between the absolute longitudinal speed Vx_abs_can of the candidate reflection point Pcan and an absolute longitudinal speed Vx_abs_base of the base fusion object FSbase (ΔVx_abs=|Vx_abs_can−Vx_abs_base|), is equal to or smaller than a predetermined longitudinal speed difference ΔVx_abs_th, and the absolute value ΔVy_abs of a difference between the absolute lateral speed Vy_abs_can of the candidate reflection point Pcan and an absolute lateral speed Vy_abs_base of the base fusion object FSbase (ΔVy_abs=|Vy_abs_can−Vy_abs_base|), is equal to or smaller than a predetermined lateral speed difference ΔVy_abs_th.

When there are the one or more candidate reflection points Pcan which satisfy the condition G1 and the condition G2, the embodiment apparatus integrates the one or more candidate reflection points Pcan into the base fusion object FSbase to produce the new fusion object FSnew, thereby updating the last time fusion object FSlast.

When the one or more candidate reflection points Pcan which satisfy the condition G1 and the condition G2 are the reflection point Pref_1 and the reflection point Pref_2 in the example shown in FIG. 6, the embodiment apparatus integrates the reflection point Pref_1 and the reflection point Pref_2 into the base fusion object FSbase to produce the new fusion object FSnew, thereby updating the last time fusion object FSlast.

When there are the one or more reflection points Pref which are not integrated into the base fusion object FSbase after the embodiment apparatus executes the object update process for all the last time fusion object FSlast, the embodiment apparatus executes the object production process.

In executing the object production process, the embodiment apparatus selects the arbitrary reflection point Pref from among the one or more reflection points Pref which are not integrated into the base fusion object FSbase in executing the object update process, as the base reflection point Pref_base. In addition, the embodiment apparatus selects the one or more reflection points Pref which are candidates to be integrated into the selected base reflection point Pref_base in question, as the one or more candidate reflection points Pcan. Hereinafter, the reflection point Pref which is not integrated into the base fusion object FSbase, will be referred to as "the remaining reflection point Pref_rem".

Figure 7:
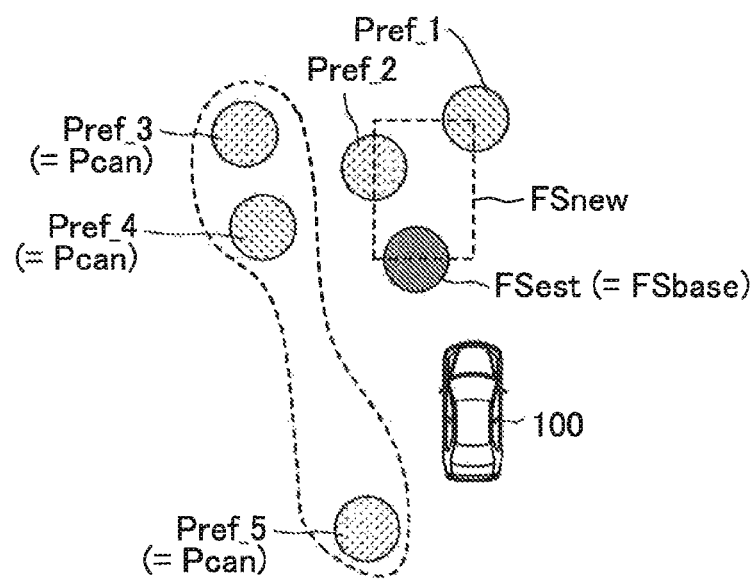
FIG. 7 is a view used for describing the fusion process.

In an example shown in FIG. 7, the remaining reflection points Pref_rem are the reflection point Pref_3, the reflection point Pref_4, and the reflection point Pref_5, the reflection point Pref_3 is selected as the base reflection point Pref_base, and the reflection point Pref_4 and the reflection point Pref_5 are selected as the candidate reflection points Pcan.

The embodiment apparatus determines whether each of the one or more candidate reflection points Pcan satisfies a condition G3 with respect to the base reflection point Pref_base and a condition G4 with respect to the base reflection point Pref_base. A predetermined longitudinal distance ΔDx_th used in the condition G3 is a value "L0*0.5+α". A predetermined longitudinal distance ΔDy_th used in the condition G4 is a value "W0*0.5+β". The parameter L0 and the parameter W0 are appropriately-set arbitrary constant values, respectively. For example, the parameter L0 is a standard longitudinal length of a four-wheel vehicle, and the parameter W0 is a standard width of the four-wheel vehicle. The parameters α and β are appropriately-set arbitrary constant values, respectively.

<Condition G3>

The condition G3 is a condition that the absolute value ΔDx of the difference between the X-coordinate Px (=Px_can) of the candidate reflection point Pcan and the X-coordinate Px (=Px_base) of the base reflection point Pref_base (ΔDx=|Px_can−Px_base|), is equal to or smaller than the predetermined longitudinal distance ΔDx_th, and the absolute value ΔDy of the difference between the Y-coordinate Py (=Py_can) of the candidate reflection point Pcan and the Y-coordinate Py (=Py_base) of the base reflection point Pref_base (ΔDy=|Py_can−Py_base|), is equal to or smaller than the predetermined lateral distance ΔDy_th.

<Condition G4>

The condition G4 is a condition that the absolute value ΔVx of the difference between the longitudinal relative speed Vx (=Vx_can) of the candidate reflection point Pcan and the longitudinal relative speed Vx (=Vx_base) of the base reflection point Pref_base (ΔVx=|Vx_can−Vx_base|), is equal to or smaller than the predetermined longitudinal speed difference ΔVx_th, and the absolute value ΔVy of the difference between the lateral relative speed Vy (=Vy_can) of the candidate reflection point Pcan and the lateral relative speed Vy (=Vy_base) of the base reflection point Pref_base (ΔVy=|Vy_can−Vy_base|), is equal to or smaller than the predetermined lateral speed difference ΔVy_th.

The embodiment apparatus may be configured to determine whether the condition G4 is satisfied, using the absolute longitudinal speed Vx_abs_can and the absolute lateral speed Vy_abs_can of the candidate reflection point Pcan. In particular, the condition G4 may be a condition that the absolute value ΔVx_abs of the difference between the absolute longitudinal speed Vx_abs_can of the candidate reflection point Pcan and the absolute longitudinal speed Vx_abs_base of the base reflection point Pref_base (ΔVx_abs=|Vx_abs_can−Vx_abs_base|), is equal to or smaller than the predetermined longitudinal speed difference ΔVx_abs_th, and the absolute value ΔVy_abs of the difference between the absolute lateral speed Vy_abs_can of the candidate reflection point Pcan and the absolute lateral speed Vy_abs_base of the base reflection point Pref_base (ΔVy_abs=|Vy_abs_can−Vy_abs_base|), is equal to or smaller than the predetermined lateral speed difference ΔVy_abs_th.

When there are the one or more candidate reflection points Pcan which satisfy the condition G3 and the condition G4, the embodiment apparatus integrates the one or more candidate reflection points Pcan into the base reflection point Pref_base to produce the new fusion object FSnew.

When the one or more candidate reflection points Pcan which satisfy the condition G3 and the condition G4, is the reflection point Pref_4 in the example shown in FIG. 7, the embodiment apparatus integrates the reflection point Pref_4 into the base reflection point Pref_base to produce the new fusion object FSnew.

When there are the one or more base reflection points Pref_base, into which no candidate reflection point Pcan is integrated after the embodiment apparatus executes the object production process for all the remaining reflection points Pref_rem, the embodiment apparatus sets the one or more base reflection points Pref_base in question as the one or more new fusion object FSnew and terminates the execution of the object production process.

The embodiment apparatus executes the object update process and the object production process repeatedly at the predetermined calculation cycle to update and produce the fusion objects FS.

The embodiment apparatus stores information on the updated or produced fusion objects FS in the RAM as fusion object information. In particular, the embodiment apparatus stores information on the X-coordinate Px (=Px_fs) of the fusion object FS, the Y-coordinate Py (=Py_fs) of the fusion object FS, the longitudinal relative speed Vx (=Vx_fs) of the fusion object FS, the lateral relative speed Vy (=Vy_fs) of the fusion object FS, the length L of the fusion object FS, and the width W of the fusion object FS as the cubic object information in the RAM.

The X-coordinate Px_fs of the fusion object FS is a distance between the own vehicle 100 and the fusion object FS in the X-axis direction. In this embodiment, the X-coordinate Px_fs is the X-coordinate Px of a center point of the fusion object FS. Further, the Y-coordinate Py_fs of the fusion object FS is a distance between the own vehicle 100 and the fusion object FS in the Y-axis direction. In this embodiment, the Y-coordinate Py_fs is the Y-coordinate of the center point of the fusion object FS.

In addition, the embodiment apparatus calculates an absolute value of a difference between a maximum X-coordinate Px_max and a minimum X-coordinate Px_min as the length L of the fusion object FS (L=|Px_max−Px_min|). The length L of the fusion object FS is a length of the fusion object FS in the X-axis direction. The maximum X-coordinate Px_max is a maximum value among the X-coordinates Px of the one or more reflection points Pref of the fusion object FS. The minimum X-coordinate Px_min is a minimum value among the X-coordinates Px of the one or more reflection points Pref of the fusion object FS.

Figure 8:
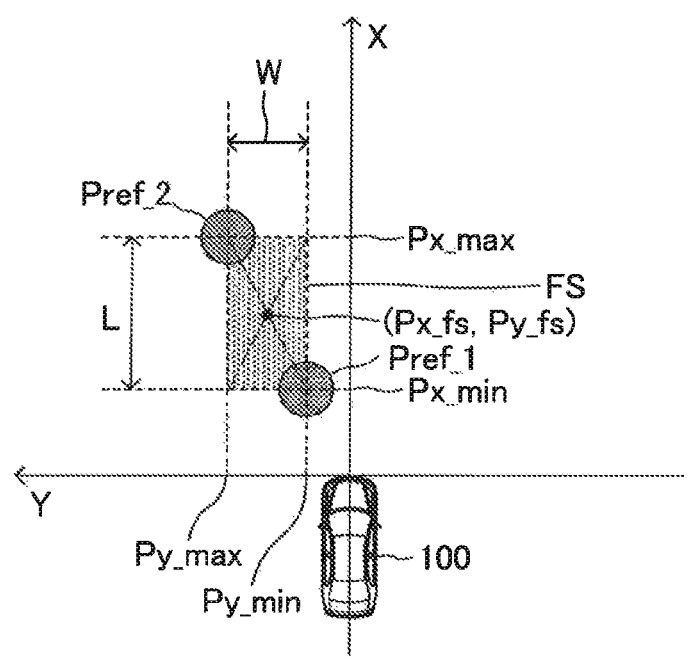
FIG. 8 is a view used for describing a length and a width of a fusion object.

FIG. 8 shows the fusion object FS produced by integrating the reflection point Pref_1 and the reflection point Pref_2. In an example shown in FIG. 8, the X-coordinate Px of the reflection point Pref_2 is the maximum X-coordinate Px_max, and the X-coordinate Px of the reflection point Pref_1 is the minimum X-coordinate Px_min.

In addition, the embodiment apparatus calculates an absolute value of a difference between a maximum Y-coordinate Py_max and a minimum Y-coordinate Py_min as the width W of the fusion object FS (W=|Py_max−Py_min|). The width W of the fusion object FS is a length of the fusion object FS in the Y-axis direction. The maximum Y-coordinate Py_max is a maximum value among the Y-coordinates Py of the one or more reflection points Pref the fusion object FS. The minimum Y-coordinate Py_min is a minimum value among the Y-coordinates Py of the one or more reflection points Pref of the fusion object FS.

In the example shown in FIG. 8, the Y-coordinate Py of the reflection point Pref_2 is the maximum Y-coordinate Py_max, and the Y-coordinate Py of the reflection point Pref_1 is the minimum Y-coordinate Py_min.

In addition, the embodiment apparatus acquires an average value of the longitudinal relative speeds Vx of the one or more reflection points Pref of the fusion object FS as the longitudinal relative speed Vx_fs of the fusion object FS. Further, the embodiment apparatus acquires an average value of the lateral relative speeds Vy of the one or more reflection points Pref of the fusion object FS as the lateral relative speed Vx_fs of the fusion object FS. The longitudinal relative speed Vx_fs of the fusion object FS is a speed of the fusion object FS with respect to the own vehicle 100 in the X-axis direction. The lateral relative speed Vy_fs of the fusion object FS is a speed of the fusion object FS with respect to the own vehicle 100 in the Y-axis direction.

The embodiment apparatus executes the lane change execution condition determination process when the execution of the lane change assist control is requested while the lane keeping control is executed. The embodiment apparatus executes the lane change execution condition determination process, using the cubic object information. As described above, the cubic object information is acquired by executing the fusion process.

If the embodiment apparatus is configured to start to execute the fusion process to acquire the cubic object information in response to the execution of the lane change assist control being requested, a time taken to complete the lane change execution condition determination process, becomes long. As a result, a time of starting to execute the lane change assist control may be delayed. Therefore, the fusion process is preferably executed to acquire the cubic object information before the execution of the lane change assist control is requested.

However, if the number of the cubic objects, which the ECU 90 continues to acquire the information on, is large, a computing load for executing the fusion process, is large. If the computing load exceeds a maximum computing power of the ECU 90, the ECU 90 may not acquire the cubic objects accurately. Therefore, it is desired that the number of the cubic objects subject to the fusion process is limited.

Accordingly, the embodiment apparatus selects the one or more fusion objects FS from among the one or more fusion objects FS, as one or more information-acquiring-target cubic objects or one or more condition-determining-target-candidate cubic objects, respectively with the number of the selected fusion objects FS as the information-acquiring-target cubic objects being limited to a first predetermined number (in this embodiment, twelve). The information-acquiring-target cubic object is a target which the embodiment apparatus continues to acquire the information on by executing the fusion process. When the execution of the lane change assist control is requested, the embodiment selects the one or more information-acquiring-target cubic objects from among the one or more information-acquiring-target cubic objects, as one or more condition-determining-target cubic objects, respectively with the number of the selected information-acquiring-target cubic objects as the condition-determining-target cubic objects being limited to a second predetermined number (in this embodiment, six). The condition-determining-target cubic object is a target subject to the lane change execution condition determination process. The embodiment apparatus executes the lane change execution condition determination process for the one or more condition-determining-target cubic objects.

As described above, in this embodiment, the first predetermined number is twelve, and the second predetermined number is six. The second predetermined number is smaller than the first predetermined number. In this regard, the second predetermined number may be equal to the first predetermined number. In other words, the second predetermined number may be equal to or smaller than the first predetermined number.

A possibility that the own vehicle 100 contacts the cubic object near the own vehicle 100 while the own vehicle 100 is caused to move to the target next lane, is higher than a possibility that the own vehicle 100 contacts the cubic object apart from the own vehicle 100 while the own vehicle 100 is caused to move to the target next lane. Therefore, a method for selecting the twelve cubic objects as the information-acquiring-target cubic objects in order of increasing distance from the own vehicle 100 may be employed as a method for selecting the cubic objects as the information-acquiring-target cubic objects.

However, the cubic object existing away from the own vehicle 100, but approaching the own vehicle at a high speed, is likely to move closer to the own vehicle 100 while the own vehicle 100 is caused to move to the target next lane. Therefore, the cubic object existing away from the own vehicle 100, but approaching the own vehicle at the high speed, has a high possibility that the own vehicle 100 contacts the cubic object in question while the own vehicle 100 is caused to move to the target next lane.

<Information-Acquiring-Target Cubic Objects>

Figure 9:
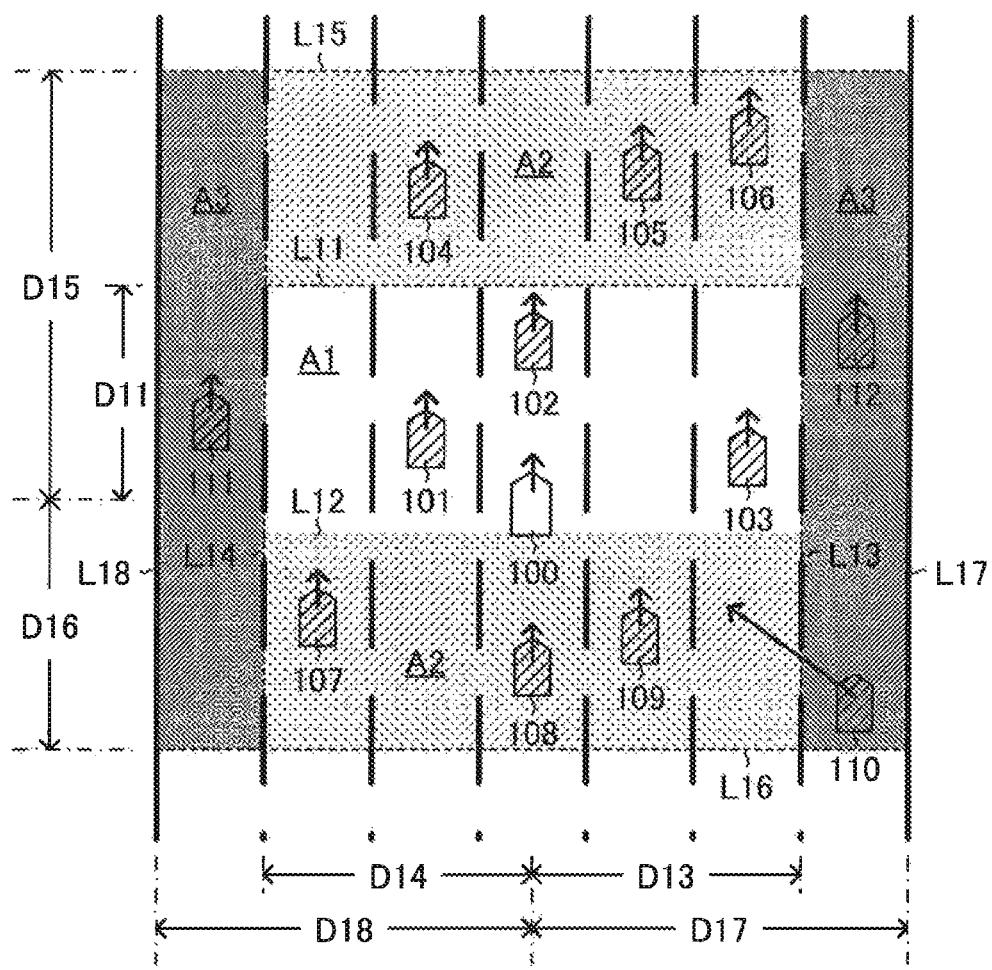
FIG. 9 is a view used for describing a process of selecting cubic objects as information-acquiring-target cubic objects.

Accordingly, the embodiment apparatus executes an information-acquiring-target cubic object selection process for selecting the one or more cubic objects as the one or more information-acquiring-target cubic objects (i.e., the one or more condition-determining-target-candidate cubic objects) as described below. In particular, as shown in FIG. 9, the embodiment apparatus executes a first sub-selection process for selecting the one or more cubic objects from among the one or more cubic objects existing in an area A1 in order of increasing distance with respect to the own vehicle 100, as the one or more information-acquiring-target cubic objects (i.e., the one or more condition-determining-target-candidate cubic objects), respectively.

In this embodiment, the area A1 is an area defined by a front line L11, a rear line L12, a left line L14, and a right line L13. The front line L11 is a line extending perpendicular to the longitudinal center line LC of the own vehicle 100 and passing a point on the longitudinal center line LC away forward from the reference point P of the own vehicle 100 by a predetermined distance D11. Hereinafter, the longitudinal center line LC will be referred to as "the own vehicle center line LC". The rear line L12 is a line extending perpendicular to the own vehicle center line LC and passing a rear end of the own vehicle 100. The left line L14 is a line extending parallel to the own vehicle center line LC and away leftward from the own vehicle center line LC by a predetermined distance D14. The right line L13 is a line extending parallel to the own vehicle center line LC and away rightward from the own vehicle center line LC by a predetermined distance D13. In this embodiment, the predetermined distance D14 is equal to the predetermined distance D13.

The embodiment apparatus terminates the execution of the first sub-selection process when the number of the information-acquiring-target cubic objects selected in executing the first sub-selection process, reaches twelve. In an example shown in FIG. 9, the cubic objects 101 to 103 are in the area A1. Thus, the cubic objects 101 to 103 are selected as the information-acquiring-target cubic objects, respectively. As a result, the number of the information-acquiring-target cubic objects selected at this time, is three.

When the number of the information-acquiring-target cubic objects selected in executing the first sub-selection process, does not reach twelve, the embodiment apparatus executes a second sub-selection process for selecting the one or more cubic objects from among the one or more cubic objects existing in an area A2 in order of increasing distance with respect to the own vehicle 100, as the one or more information-acquiring-target cubic objects (i.e., the one or more condition-determining-target-candidate cubic objects), respectively.

In this embodiment, the area A2 includes an area defined by the front line L11, the left line L14, the right line L13, and a front line L15 and an area defined by the rear line L12, the left line L14, the right line L13, and a rear line L16. The front line L15 is a line extending perpendicular to the own vehicle center line LC and passing a point on the own vehicle longitudinal center line LC away forward from the reference point P of the own vehicle 100 by a predetermined distance D15. In this embodiment, the predetermined distance D15 is larger than the predetermined distance D11. Further, the rear line L16 is a line extending perpendicular to the own vehicle center line LC and passing a point on the own vehicle longitudinal center line LC away rearward from the reference point P of the own vehicle 100 by a predetermined distance D16. In this embodiment, the predetermined distance D16 is equal to the predetermined distance D15.

The embodiment apparatus terminates the execution of the second sub-selection process when the total number of the information-acquiring-target cubic objects selected in executing the first and second sub-selection processes, reaches twelve. In the example shown in FIG. 9, the cubic objects 104 to 109 are in the area A2. The number of the information-acquiring-target cubic objects is three when the execution of the second setting process is started. Thus, the cubic objects 104 to 109 are selected as the information-acquiring-target cubic objects, respectively. As a result, the total number of the information-acquiring-target cubic objects selected at this time, is nine.

When the total number of the information-acquiring-target cubic objects selected in executing the second sub-selection process, does not reach twelve, the embodiment apparatus executes a third sub-selection process for selecting the one or more cubic objects from among the one or more cubic objects existing in an area A3 and having predicted reaching time TTC equal to or shorter than a predetermined predicted reaching time TTCth_1, in order of increasing predicted reaching time TTC, as the one or more information-acquiring-target cubic objects (i.e., the one or more condition-determining-target-candidate cubic objects), respectively.

In this embodiment, the area A3 includes an area defined by the front line L15, the rear line L16, the left line L14, and a left line L18 and an area defined by the front line L15, the rear line L16, the right line L13, and a right line L17. The left line L18 is a line extending parallel to the own vehicle center line LC and away leftward from the own vehicle center line LC by a predetermined distance D18. In this embodiment, the predetermined distance D18 is larger than the predetermined distance D14. Further, the right line L17 is a line extending parallel to the own vehicle center line LC and away rightward from the own vehicle center line LC by a predetermined distance D17. In this embodiment, the predetermined distance D17 is larger than the predetermined distance D13 and is equal to the predetermined distance D18.

The embodiment apparatus terminates the execution of the third sub-selection process when the total number of the information-acquiring-target cubic objects selected in the first, second, and third sub-selection processes, reaches twelve. In the example shown in FIG. 9, the cubic objects 110 to 112 are in the area A3. The cubic object 110 has the predicted reaching time TTC equal to or shorter than the predetermined predicted reaching time TTCth_1. The cubic objects 111 and 112 have the predicted reaching time TTC longer than the predetermined predicted reaching time TTCth_1. The total number of the information-acquiring-target cubic objects is nine when the execution of the third sub-selection process is started. Thus, the cubic object 110 is selected as the information-acquiring-target cubic object. As a result, the total number of the information-acquiring-target cubic objects selected at this time, is ten.

When the total number of the information-acquiring-target cubic objects selected in executing the third sub-selection process, does not reach twelve, the embodiment apparatus executes a fourth sub-selection process for selecting the one or more cubic objects from among the one or more cubic objects existing in the area A3 and not selected as the one or more information-acquiring-target cubic objects in executing the third sub-selection process, in order of increasing distance with respect to the own vehicle 100, as the one or more information-acquiring-target cubic objects (i.e., the one or more condition-determining-target-candidate cubic objects), respectively.

The embodiment apparatus terminates the execution of the fourth sub-selection process when the total number of the information-acquiring-target cubic objects selected in the first, second, third, and fourth sub-selection processes, reaches twelve. In the example shown in FIG. 9, the cubic objects 111 and 112 exist in the area A3 and are not selected as the information-acquiring-target cubic objects in executing the third sub-selection process. The total number of the information-acquiring-target cubic objects is ten when the execution of the fourth sub-selection process is started. Thus, the cubic objects 111 and 112 are selected as the information-acquiring-target cubic objects, respectively. As a result, the total number of the information-acquiring-target cubic objects at this time, is twelve.

<Condition-Determining-Target Cubic Object>

When the execution of the lane change assist control is requested while the lane keeping control is executed, the embodiment apparatus executes a condition-determining-target cubic object selection process for selecting the cubic objects from among the one or more information-acquiring-target cubic objects (i.e., the one or more condition-determining-target-candidate cubic objects) in order of increasing distance with respect to the own vehicle 100 as the one or more condition-determining-target cubic objects.

When the number of the information-acquiring-target cubic objects is equal to or smaller than six, the embodiment apparatus selects all the information-acquiring-target cubic objects as the condition-determining-target cubic objects and terminates the execution of the condition-determining-target selection process. On the other hand, when the number of the information-acquiring-target cubic objects is larger than six, the embodiment apparatus selects the six information-acquiring-target cubic objects as the condition-determining-target cubic objects and then, terminates the execution of the condition-determining-target selection process.

The embodiment apparatus determines whether a lane change execution condition including a condition G5 and a condition G6 described below, is satisfied with respect to each of the condition-determining-target cubic objects in executing the lane change execution condition determination process.

The condition G5 is a condition that the predicted reaching time TTC of each of the condition-determining-target cubic objects is equal to or longer than a predetermined reaching time TTCth_2. It should be noted that the predicted reaching time TTC is acquired by dividing the longitudinal distance Px of the condition-determining-target cubic object by the longitudinal relative speed Vx of the condition-determining-target cubic object.

The condition G6 is a condition that each of the condition-determining-target cubic objects in the target next lane does not exist immediately beside the own vehicle 100. In other word, each of the condition-determining-target cubic objects does not exist within an area defined by the X-coordinate Px of the front end of the own vehicle 100 and the X-coordinate Px of the rear end of the own vehicle 100.

When the lane change execution condition is satisfied for each of the condition-determining-target cubic objects, the embodiment apparatus starts the execution of the lane change assist control.

According to the embodiment apparatus, the number of the cubic objects selected as the information-acquiring-target cubic objects, is limited to a certain constant number. Thus, the computing load for executing the fusion process can be reduced. As a result, the fusion process can be executed quickly and accurately.

In addition, the cubic object having the predicted reaching time TTC equal to or shorter than the predetermined predicted reaching time TTCth_1 is selected as the information-acquiring-target cubic object in executing the third sub-selection process. Thus, the own vehicle 100 can be caused to move to the target next lane safely.

<Concrete Operation of Embodiment Apparatus>

Figure 10:
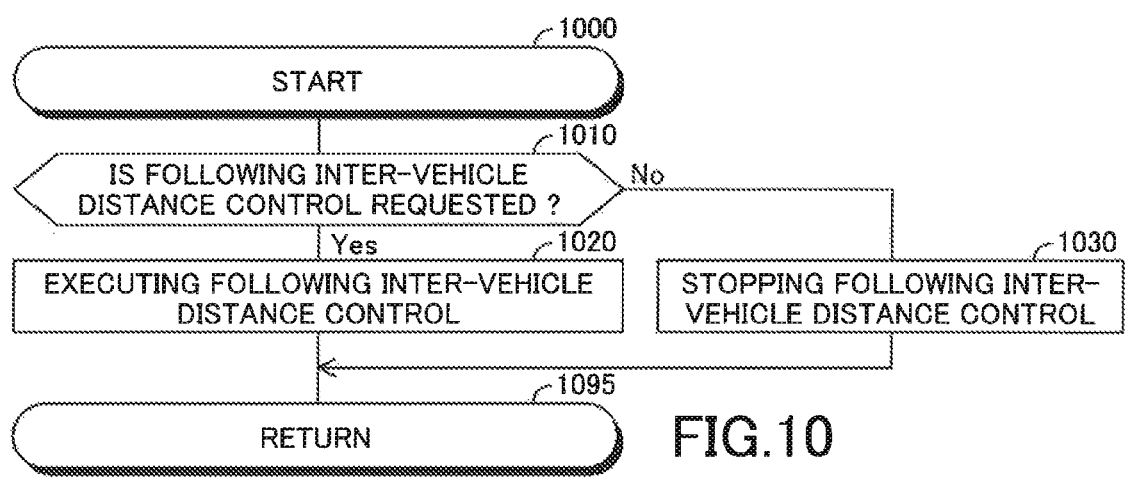
FIG. 10 is a view for showing a flowchart of a routine executed by a CPU of an ECU shown in FIG. 1.

The CPU of the ECU 90 of the embodiment apparatus is configured or programmed to execute a routine shown by a flowchart in FIG. 10 each time a predetermined time $\Delta t$ elapses.

Therefore, at a predetermined timing, the CPU starts a process from a step 1000 in FIG. 10 and then, proceeds with the process to a step 1010 to determine whether the execution of the following inter-vehicle distance control is requested. When the execution of the following inter-vehicle distance control is requested, the CPU determines "Yes" at the step 1010 and then, executes a process of a step 1020 described below. Then, the CPU proceeds with the process to a step 1095 to terminate this routine once.

Step 1020: The CPU executes the following inter-vehicle distance control When the CPU has executed the following inter-vehicle distance control in executing the process of this step, the CPU continues to execute the following inter-vehicle distance control. On the other hand, when the CPU does not execute the following inter-vehicle distance control in executing the process of this step, the CPU starts the execution of the following inter-vehicle distance control.

On the other hand, when the execution of the following inter-vehicle distance control is not requested, the CPU determines "No" at the step 1010 and then, executes a process of a step 1030 described below. Then, the CPU proceeds with the process to the step 1095 to terminate this routine once.

Step 1030: The CPU stops the execution of the following inter-vehicle distance control. When the CPU has stopped the execution of the following inter-vehicle distance control in executing the process of this step, the CPU continues to stop the execution of the following inter-vehicle distance control.

Figure 11:
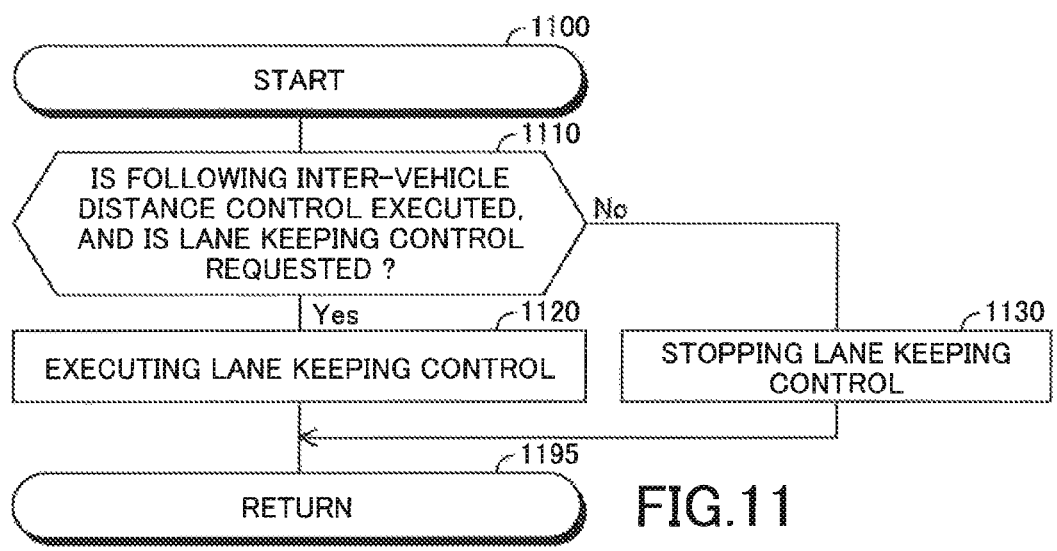
FIG. 11 is a view for showing a flowchart of a routine executed by the CPU.

Further, the CPU is configured or programmed to execute a routine shown by a flowchart in FIG. 11 each time the predetermined time $\Delta t$ elapses.

Therefore, at a predetermined timing, the CPU starts a process from a step 1100 in FIG. 11 and then, proceeds with the process to a step 1110 to determine whether the following inter-vehicle distance control is executed, and the execution of the lane keeping control is requested. When the following inter-vehicle distance control is executed, and the execution of the lane keeping control is requested, the CPU determines "Yes" at the step 1110 and then, executes a process of a step 1120 described below. Then, the CPU proceeds with the process to a step 1195 to terminate this routine once.

Step 1120: The CPU executes the lane keeping control. When the CPU has executed the lane keeping control in executing the process of this step, the CPU continues to execute the lane keeping control. On the other hand, when the CPU does not execute the lane keeping control in executing the process of this step, the CPU starts the execution of the lane keeping control.

On the other hand, when the following inter-vehicle distance control is not executed, or the execution of the lane keeping control is not requested, the CPU determines "No" at the step 1110 and then, executes a process of a step 1130 described below. Then, the CPU proceeds with the process to the step 1195 to terminate this routine once.

Step 1130: The CPU stops the execution of the lane keeping control. When the CPU has stopped the execution of the lane keeping control in executing the process of this step, the CPU continues to stop the execution of the lane keeping control.

Figure 12:
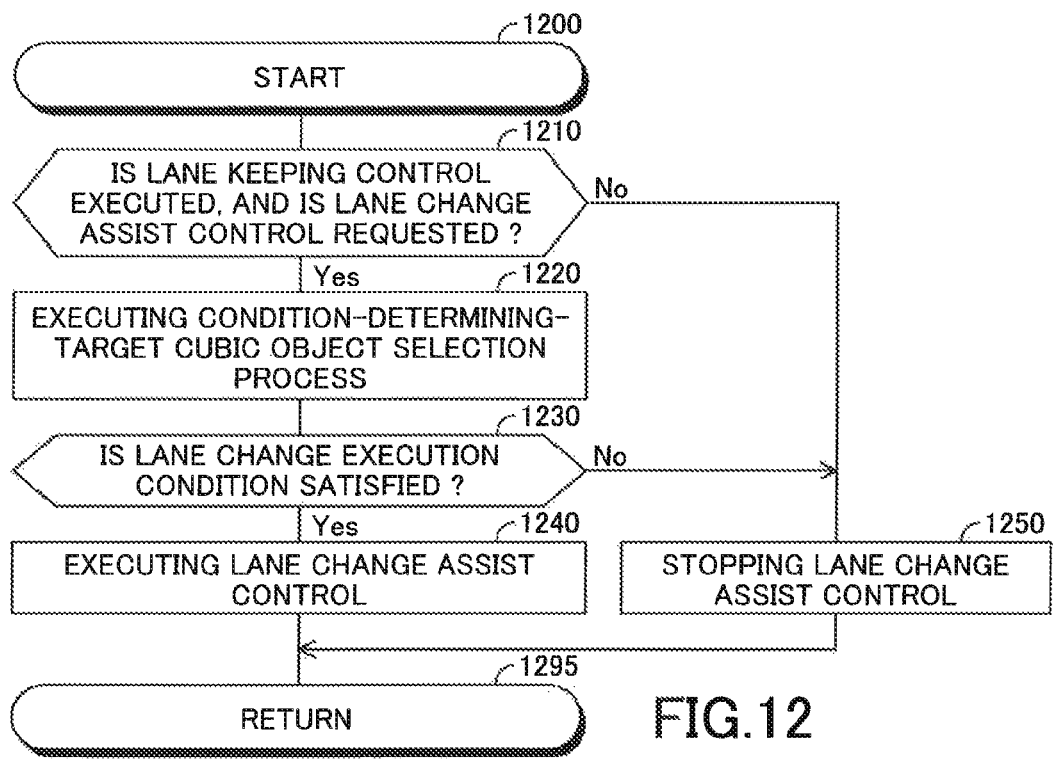
FIG. 12 is a view for showing a flowchart of a routine executed by the CPU.

Further, the CPU is configured or programmed to execute a routine shown by a flowchart in FIG. 12 each time the predetermined time $\Delta t$ elapses.

Therefore, the CPU starts a process from a step 1200 in FIG. 12 and then, proceeds with the process to a step 1210 to determine whether the lane keeping control is executed, and the execution of the lane change assist control is requested. When the lane keeping control is executed, and the execution of the lane change assist control is requested, the CPU determines "Yes" at the step 1210 and then, executes a process of a step 1220 described below. Then, the CPU proceeds with the process to a step 1230.

Step 1220: The CPU executes the condition-determining-target cubic object selection process to select the one or more cubic objects from among the one or more information-acquiring-target cubic objects as the one or more condition-determining-target cubic objects.

When the CPU proceeds with the process to the step 1230, the CPU determines whether each of the one or more condition-determining-target cubic objects selected at the step 1220 satisfy the lane change execution condition. When each of the one or more condition-determining-target cubic objects selected at the step 1220 satisfy the lane change execution condition, the CPU determines "Yes" at the step 1230 and then, executes a process of a step 1240 described below. Then, the CPU proceeds with the process to a step 1295 to terminate this routine once.

Step 1240: The CPU executes the lane change assist control. When the CPU has executed the lane change assist control in executing the process of this step, the CPU continues to execute the lane change assist control. On the other hand, when the CPU does not execute the lane change assist control in executing the process of this step, the CPU starts the execution of the lane change assist control.

On the other hand, when any of the one or more condition-determining-target cubic objects selected at the step 1220 does not satisfy the lane change execution condition, the CPU determines "No" at the step 1230 and then, executes a process of a step 1250 described below. Then, the CPU proceeds with the process to the step 1295 to terminate this routine once.

Step 1250: The CPU stops the execution of the lane change assist control. When the CPU has stopped the lane change assist control in executing the process of this step, the CPU continues to stop the execution of the lane change assist control.

When the lane keeping control is not executed, or the execution of the lane change assist control is not requested at a time of executing a process of the step 1210, the CPU determines "No" at the step 1210 and then, executes the process of the step 1250 described above. Then, the CPU proceeds with the process to the step 1295 to terminate this routine once.

Further, the CPU is configured or programmed to execute a routine shown by a flowchart in FIG. 13 each time the predetermined time $\Delta t$ elapses Therefore, at a predetermined timing, the CPU starts a process from a step 1300 in FIG. 13 and then, sequentially executes processes of steps 1310 and 1320 described below. Then, the CPU proceeds with the process to a step 1330.

Step 1310: The CPU acquires the reflection point information.

Step 1320: The CPU executes the fusion process, using the reflection point information acquired at the step 1310.

Figure 14:
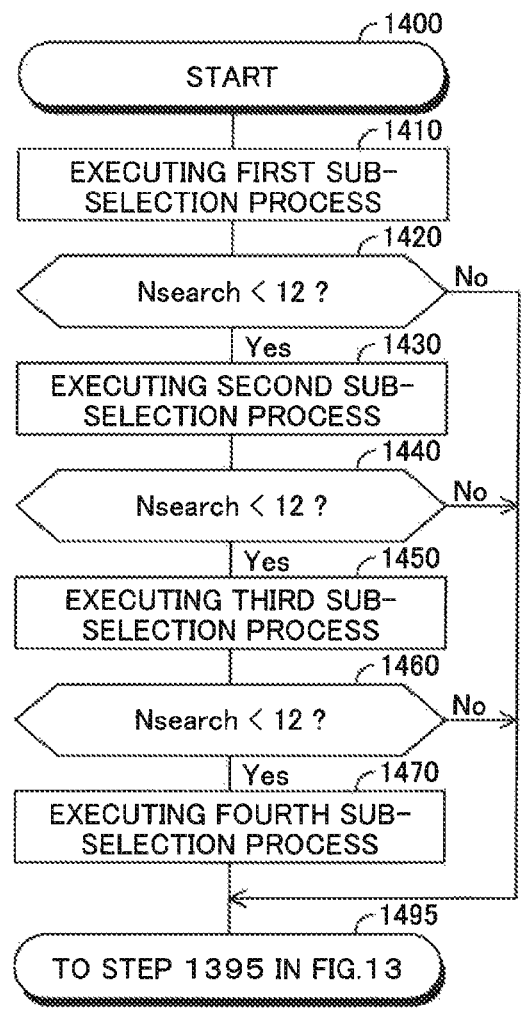
FIG. 14 is a view for showing a flowchart of a routine executed by the CPU.

When the CPU proceeds with the process to the step 1330, the CPU executes the information-acquiring-target cubic object selection process by executing a routine shown by a flowchart in FIG. 14. Therefore, when the CPU proceeds with the process to the step 1330, the CPU starts a process from a step 1400 and then, executes a process of a step 1410 described below. Then, the CPU proceeds with the process to a step 1420.

Step 1410: The CPU executes the first sub-selection process, using the cubic object information.

When the CPU proceeds with the process to the step 1420, the CPU determines whether the total number of the information-acquiring-target cubic objects selected by the process of the step 1410, is smaller than twelve. When the number of the information-acquiring-target cubic objects selected by the process of the step 1410, is smaller than twelve, the CPU determines "Yes" at the step 1420 and then, executes a process of a step 1430. Then, the CPU proceeds with the process to a step 1440.

Step 1430: The CPU executes the second sub-selection process, using the cubic object information.

When the CPU proceeds with the process to the step 1440, the CPU determines whether the total number of the information-acquiring-target cubic objects selected by the processes of the steps 1410 and 1430, is smaller than twelve. When the total number of the information-acquiring-target cubic objects selected by the processes of the steps 1410 and 1430, is smaller than twelve, the CPU determines "Yes" at the step 1440 and then, executes a process of a step 1450 described below. Then, the CPU proceeds with the process to a step 1460.

Step 1450: The CPU executes the third sub-selection process, using the cubic object information.

When the CPU proceeds with the process to the step 1460, the CPU determines whether the total number of the information-acquiring-target cubic objects selected by the processes of the steps 1410, 1430, and 1450, is smaller than twelve. When the total number of the information-acquiring-target cubic objects selected by the processes of the steps 1410, 1430, and 1450, is smaller than twelve, the CPU determines "Yes" at the step 1460 and then, executes a process of a step 1470 described below. Then, the CPU proceeds with the process to a step 1395 in FIG. 13 via a step 1495 to terminate this routine once.

Step 1470: The CPU executes the fourth setting process, using the cubic object information.

Figure 13:
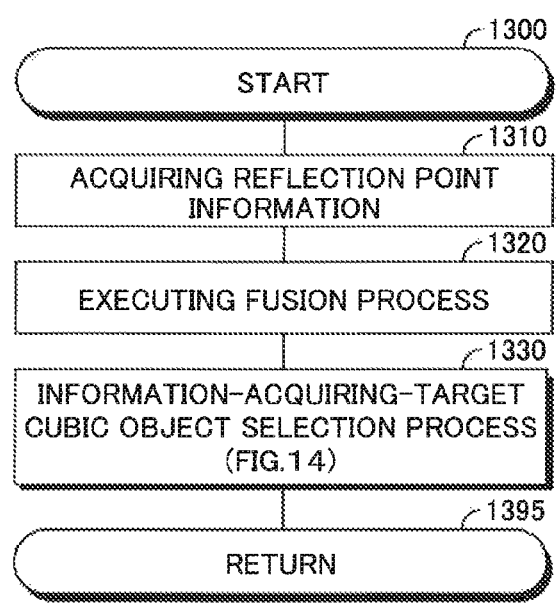
FIG. 13 is a view for showing a flowchart of a routine executed by the CPU.

When the total number of the information-acquiring-target cubic objects is twelve at a time of executing processes of the steps 1420, 1440, and 1460, the CPU determines "No" at the steps 1420, 1440, and 1460, respectively and then, proceeds with the process to the step 1395 in FIG. 13 via the step 1495 to terminate this routine once.

According to the embodiment apparatus executing the routines shown in FIG. 10 to FIG. 14, the computing load for executing the fusion process can be reduced, and the own vehicle 100 is caused to move to the target next lane safely by the lane change assist control.

It should be noted that the present invention is not limited to the aforementioned embodiment and various modifications can be employed within the scope of the present invention.

For example, the embodiment apparatus may be configured to execute the lane change assist control when the execution of the lane change assist control is requested, and the lane change execution condition is satisfied, independently of whether the lane keeping control is executed.

Further, the embodiment apparatus may be configured to execute the lane change assist control when the execution of the lane change assist control is requested, and the lane change execution condition is satisfied while the following inter-vehicle distance control is executed, independently of whether the lane keeping control is executed.

Further, the embodiment apparatus may be configured to execute an alternative first sub-selection process for selecting the one or more cubic objects existing in the area A1 and having the predicted reaching time TTC equal to or shorter than the predetermined predicted reaching time TTCth_1 in order of increasing predicted reaching time TTC, as the one or more information-acquiring-target cubic objects in place of the first sub-selection process described above. In this case, the embodiment apparatus may be configured to execute an additional selection process for selecting the one or more cubic objects from among the one or more cubic objects existing in the area A1 and not selected as the one or more information-acquiring-target cubic objects in executing the alternative first sub-selection process, in order of increasing distance with respect to the own vehicle 100, as the one or more information-acquiring-target cubic objects when the number of the information-acquiring-target cubic objects selected in executing the alternative first sub-selection process, does not reach twelve.

Further, the embodiment apparatus may be configured to execute an alternative second sub-selection process for selecting the one or more cubic objects existing in the area A2 and having the predicted reaching time TTC equal to or shorter than the predetermined predicted reaching time TTCth_1 in order of increasing predicted reaching time TTC, as the information-acquiring-target cubic objects in place of the second sub-selection process described above. In this case, the embodiment apparatus may be configured to execute an additional selection process for selecting the one or more cubic objects from among the one or more cubic objects existing in the area A1 and not selected as the one or more information-acquiring-target cubic objects in executing the alternative second sub-selection process, in order of increasing distance with respect to the own vehicle 100, as the one or more information-acquiring-target cubic objects when the number of the information-acquiring-target cubic objects selected in executing the alternative second sub-selection process, does not reach twelve.

Figure 15:
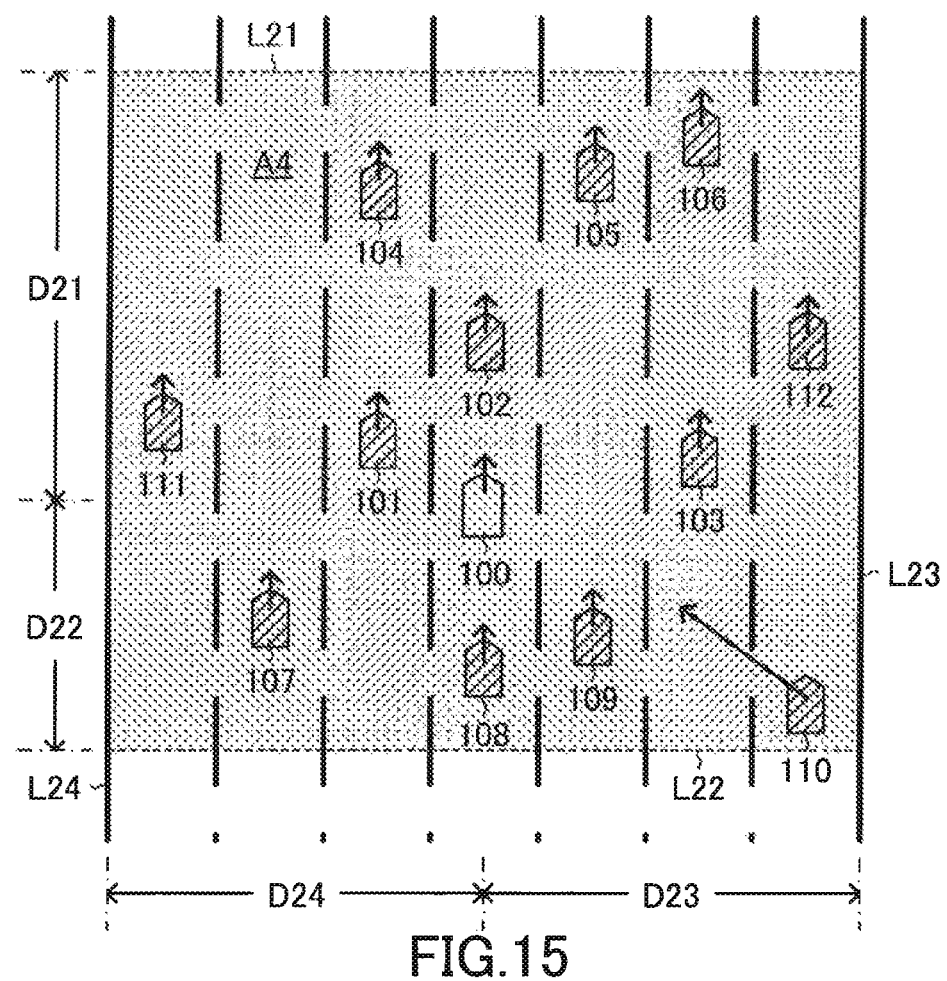
FIG. 15 is a view used for describing the process of selecting the cubic objects as the information-acquiring-target cubic objects.

Further, the embodiment apparatus may be configured to execute an alternative selection process for selecting the one or more cubic objects existing in an area A4 shown in FIG. 15 and having the predicted reaching time TTC equal to or shorter than the predetermined predicted reaching time TTCth_1 in order of increasing predicted reaching time TTC, as the one or more information-acquiring-target cubic objects in place of the first to fourth sub-selection processes described above. In this case, the embodiment apparatus may be configured to execute an additional selection process for selecting the one or more cubic objects from among the one or more cubic objects existing in the area A4 and not selected as the one or more information-acquiring-target cubic objects in executing the alternative selection process, in order of increasing distance with respect to the own vehicle 100, as the one or more information-acquiring-target cubic objects when the number of the information-acquiring-target cubic objects selected in executing the alternative selection process, does not reach twelve.

In an example shown in FIG. 15, the area A4 is an area defined by a front line L21, a rear line L22, a left line L24, and a right line L23. The front line L21 is a line extending perpendicular to the own vehicle center line LC and passing a point on the own vehicle center line LC away forward from the front end of the own vehicle 100 by a predetermined distance D21. The rear line L22 is a line extending perpendicular to the own vehicle center line LC and passing a point on the own vehicle center line LC away rearward from the rear end of the own vehicle 100 by a predetermined distance D22. The left line L24 is a line extending parallel to the own vehicle center line LC and away leftward from the own vehicle center line LC by a predetermined distance D24. The right line L23 is a line extending parallel to the own vehicle center line LC and away rightward from the own vehicle center line LC by a predetermined distance D23. In this embodiment, the predetermined distances D21, D22, D23, and D24 are equal to each other.

Further, the embodiment apparatus uses the one or more fusion objects FS as the one or more condition-determining-target cubic objects representing the one or more cubic objects existing around the own vehicle 100. In this regard, the embodiment apparatus may be configured to use one or more cubic objects each specified on the basis of one reflection point Pref, as the one or more condition-determining-target cubic objects (i.e., the cubic objects to be targets subject to the process of determining whether the lane change assist control is executed safely, in place of the one or more fusion objects FS. Further, for example, the embodiment apparatus may be configured to use the one or more cubic objects each produced on the basis of the one or more reflection points as the one or more condition-determining-target cubic objects by a method different from a method for producing the one or more fusion objects FS described above.

What is claimed is:

1. A vehicle lane change assist apparatus, comprising:
one or more sensors for detecting one or more cubic objects existing around an own vehicle and outputting information on the detected one or more cubic objects; and
an electronic control unit for processing the information on the one or more cubic objects output from the one or more sensors to recognize the one or more cubic objects as one or more recognized cubic objects,
wherein the electronic control unit is configured to:
execute a candidate selection process for determining that the one or more recognized cubic objects approaching the own vehicle and having a predicted reaching time equal to or shorter than a predetermined predicted reaching time, satisfy a first condition, the predicted reaching time being a time predictively taken for the one or more recognized cubic objects to reach the own vehicle, and selecting the one or more recognized cubic objects determined as satisfying the first condition in executing the candidate selection process, as one or more condition-determining-target-candidate cubic objects with the number of the one or more condition-determining-target-candidate cubic objects being limited to a first predetermined number;
execute a target selection process for selecting the one or more condition-determining-target-candidate cubic objects satisfying a second condition, as one or more condition-determining-target cubic objects with the number of the one or more condition-determining-target cubic objects being limited a second predetermined number equal to or smaller than the first predetermined number when an execution of a lane change assist control is requested by a driver of the own vehicle, the lane change assist control being a control for moving the own vehicle to a next lane which is a lane next to a lane, on which the own vehicle moves; and
execute the lane change assist control when a lane change execution condition is satisfied, the lane change execution condition being a condition that the own vehicle does not contact any of the one or more condition-determining-target cubic objects while the own vehicle is caused to move to the next lane by the lane change assist control, wherein
the candidate selection process includes a first candidate sub-selection process, a second candidate sub-selection process, and a third candidate sub-selection process,
the electronic control unit is further configured to:
execute the first candidate sub-selection process for determining that the one or more recognized cubic objects existing in a first predetermined area around the own vehicle, satisfy the first condition and selecting the one or more recognized cubic objects determined as satisfying the first condition in executing the first candidate sub-selection process, as the one or more condition-determining-target-candidate cubic objects with the number of the one or more condition-determining-target-candidate cubic objects selected in executing the first candidate sub-selection process being limited to the first predetermined number;
execute the second candidate sub-selection process for determining that the one or more recognized cubic objects not selected as the one or more condition-determining-target-candidate cubic objects in executing the first candidate sub-selection process, existing in a second predetermined area outside of the first predetermined area, approaching the own vehicle, and having the predicted reaching time equal to or shorter than the predetermined predicted reaching time, satisfy the first condition when the number of the one or more condition-determining-target-candidate cubic objects selected in executing the first candidate sub-selection process is smaller than the first predetermined number and selecting the one or more recognized cubic objects determined as satisfying the first condition in executing the second candidate sub-selection process, as the one or more condition-determining-target-candidate cubic objects with the number of the one or more condition-determining-target-candidate cubic objects selected in executing the first candidate sub-selection process and the second candidate sub-selection process being limited to the first predetermined number; and
execute the third candidate sub-selection process for determining that the one or more recognized cubic objects not selected as the one or more condition-determining-target candidate cubic objects in executing the first candidate sub-selection process and the second candidate sub-selection process existing in the second predetermined area, and having the predicted reaching time equal to or shorter than the predetermined predicted reaching time in order of increasing predicted reaching time, satisfy the first condition when the number of the one or more condition-determining-target-candidate cubic objects selected in executing the first candidate sub-selection process and the second candidate sub-selection process is smaller than the first predetermined number and selecting the one or more recognized cubic objects determined as satisfying the first condition in executing the third candidate sub-selection process, as the one or more condition-determining-target-candidate cubic objects with the number of the one or more condition-determining-target-candidate cubic objects selected in executing the first candidate sub-selection process, the second candidate sub-selection process, and the third candidate sub-selection process being limited to the first predetermined number.

2. The vehicle lane change assist apparatus as set forth in claim 1, wherein
the electronic control unit is configured to execute the target selection process for determining that the one or more condition-determining-target-candidate cubic objects existing in a third predetermined area around the own vehicle, as the one or more condition-determining-target-candidate cubic objects satisfying the second condition and selecting the one or more condition-determining-target-candidate cubic objects determined as satisfying the second condition, as the one or more condition-determining-target cubic objects with the number of the one or more condition-determining-target cubic objects being limited to the second predetermined number.

3. The vehicle lane change assist apparatus as set forth in claim 1, wherein the electronic control unit is configured to execute the candidate selection process in advance of the execution of the lane change assist control being requested.

* * * * *